Jan. 10, 1967   J. T. DENNIS   3,297,328
RECORD CHANGER
Original Filed Nov. 12, 1952   10 Sheets-Sheet 1
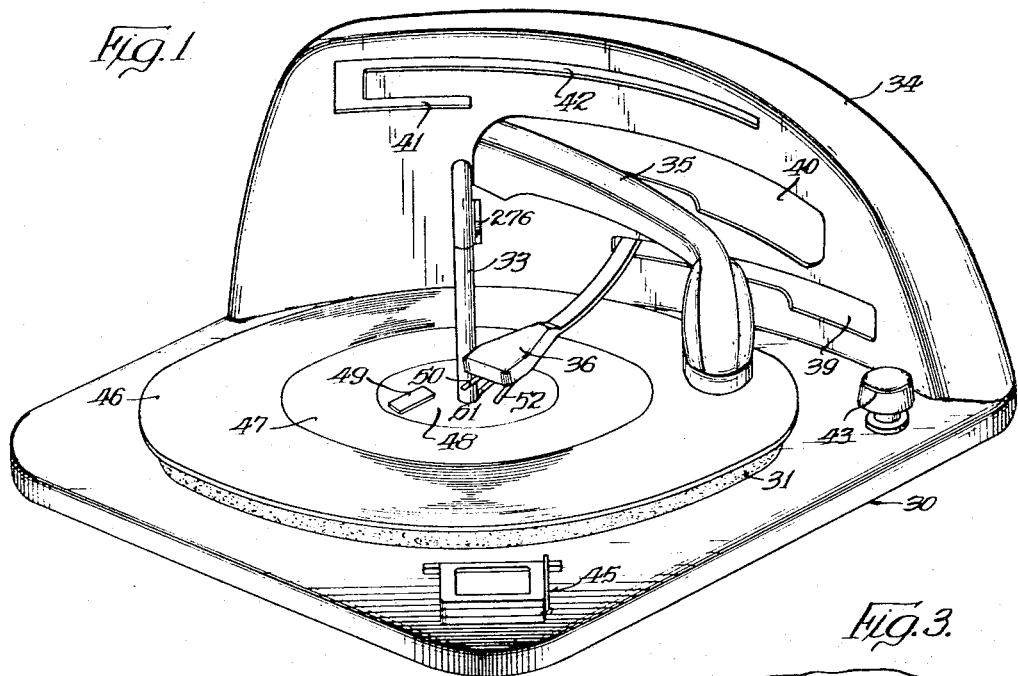
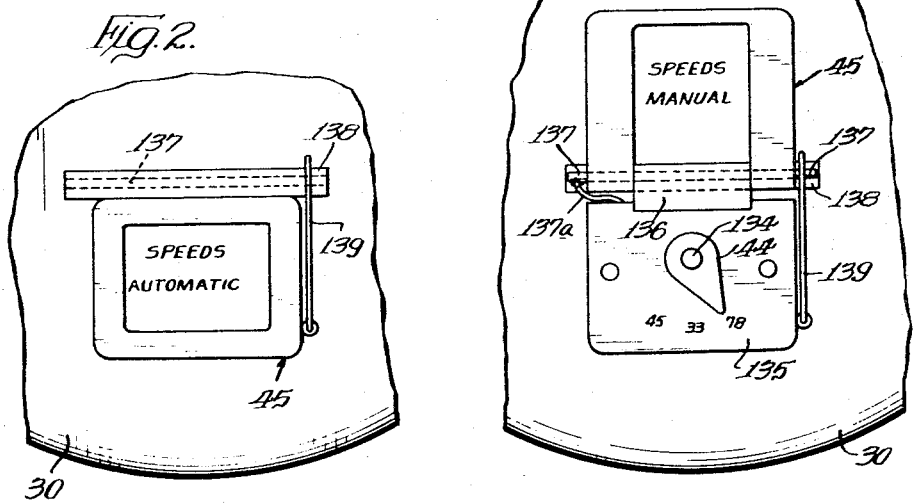
INVENTOR:
James T. Dennis,
BY:
Mason, Kolehmainen,
Rathburn & Wyss,   Attys.

Jan. 10, 1967  J. T. DENNIS  3,297,328
RECORD CHANGER
Original Filed Nov. 12, 1952  10 Sheets-Sheet 2

INVENTOR:
James T. Dennis,
BY:
Mason, Kolehmainen,
Rathburn & Wyss, Attys.

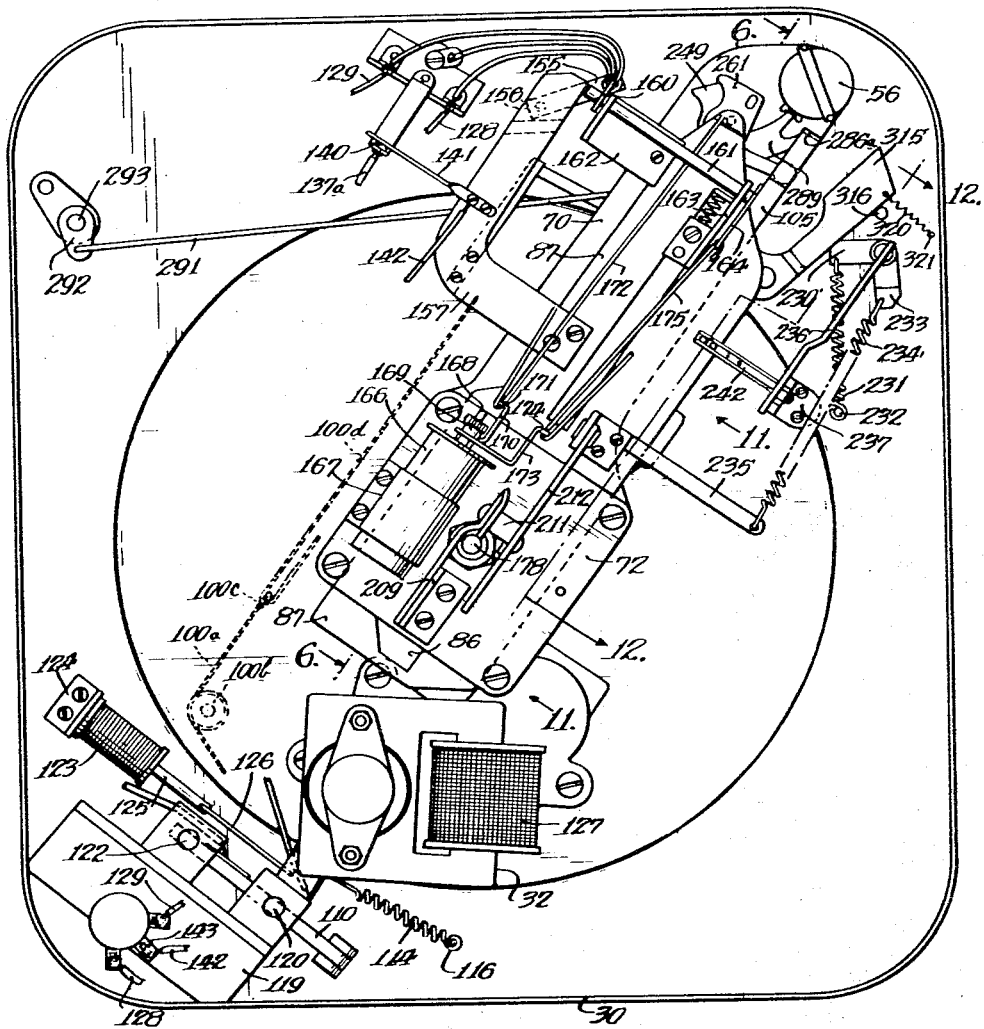

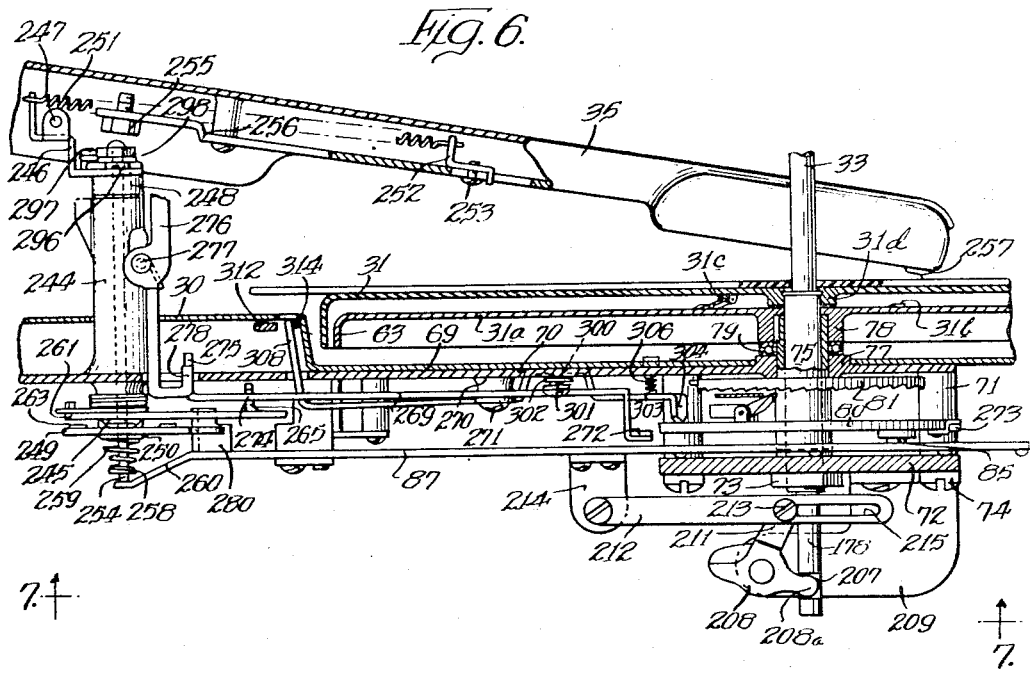
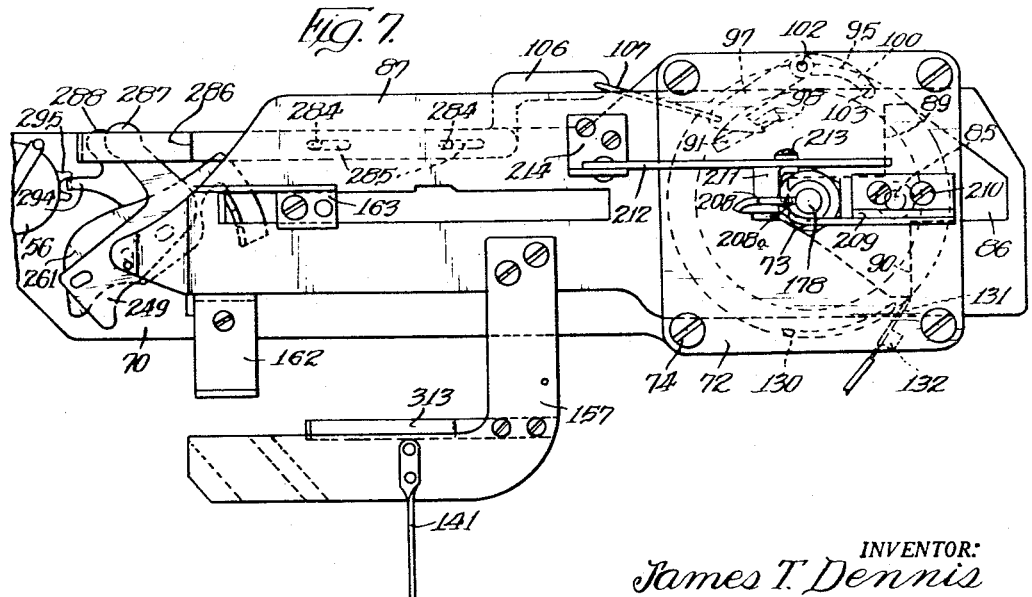

Jan. 10, 1967  J. T. DENNIS  3,297,328
RECORD CHANGER

Original Filed Nov. 12, 1952  10 Sheets-Sheet 5

INVENTOR:
James T. Dennis
BY:
Mason, Kolehmainen,
Rathburn & Wyss,
Attys.

Jan. 10, 1967  J. T. DENNIS  3,297,328
RECORD CHANGER
Original Filed Nov. 12, 1952  10 Sheets-Sheet 6
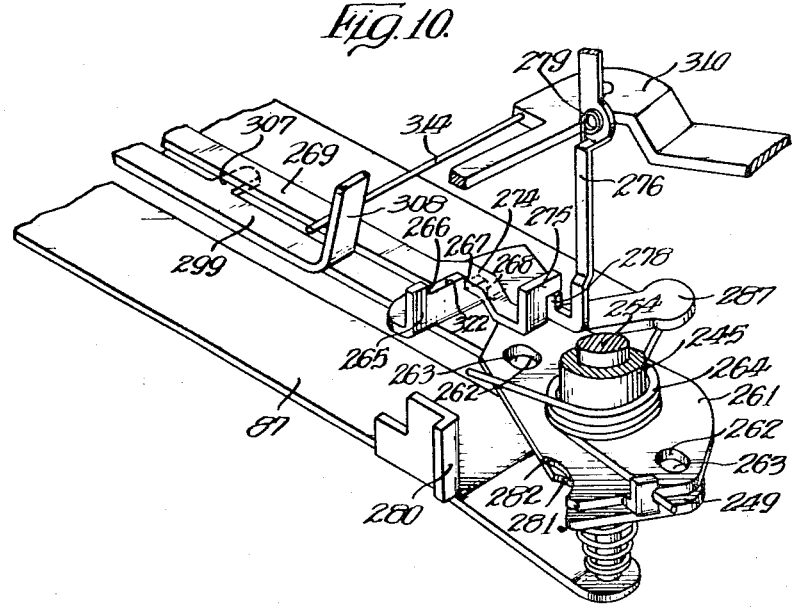
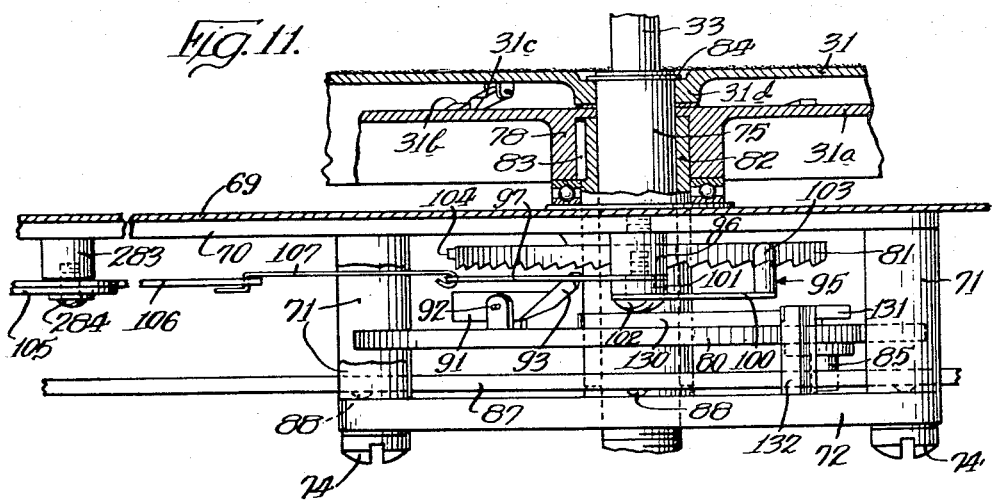
INVENTOR:
James T. Dennis
BY
Mason, Kolehmainen,
Rathburn & Wyss, Attys.

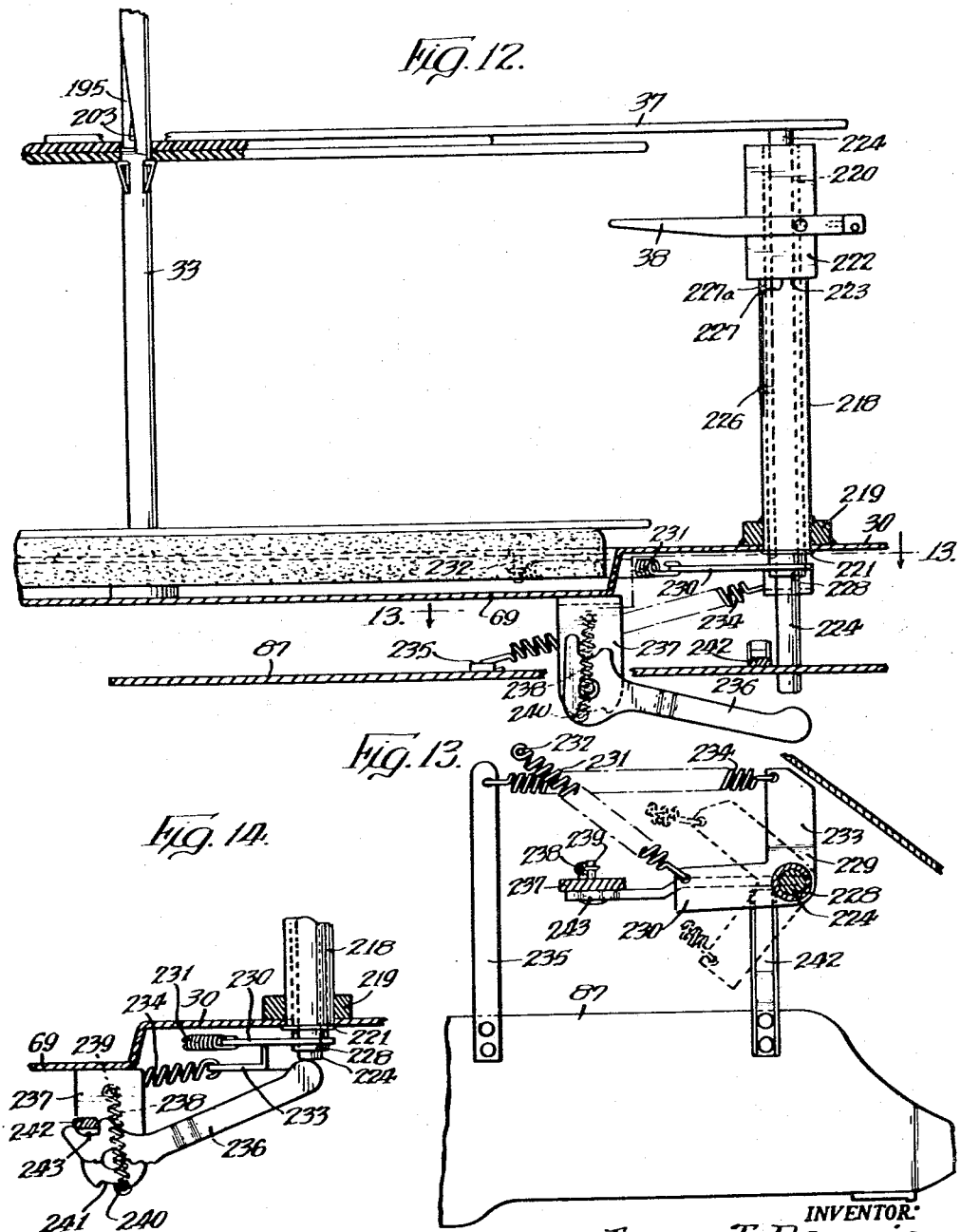

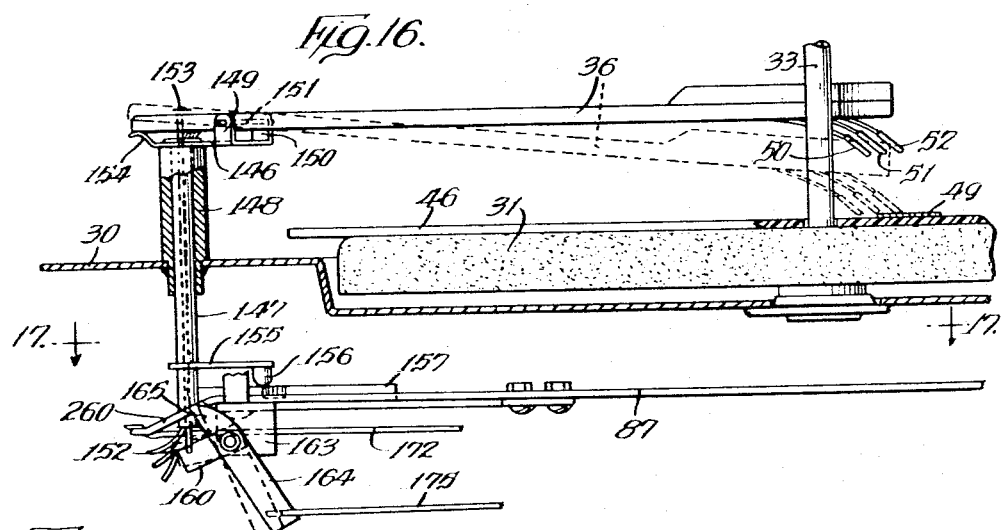
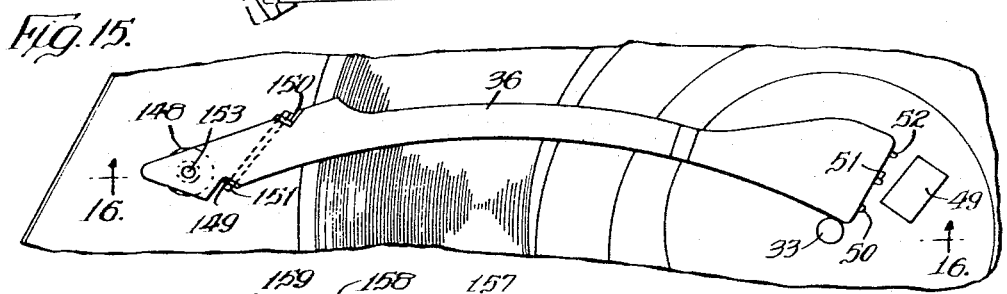
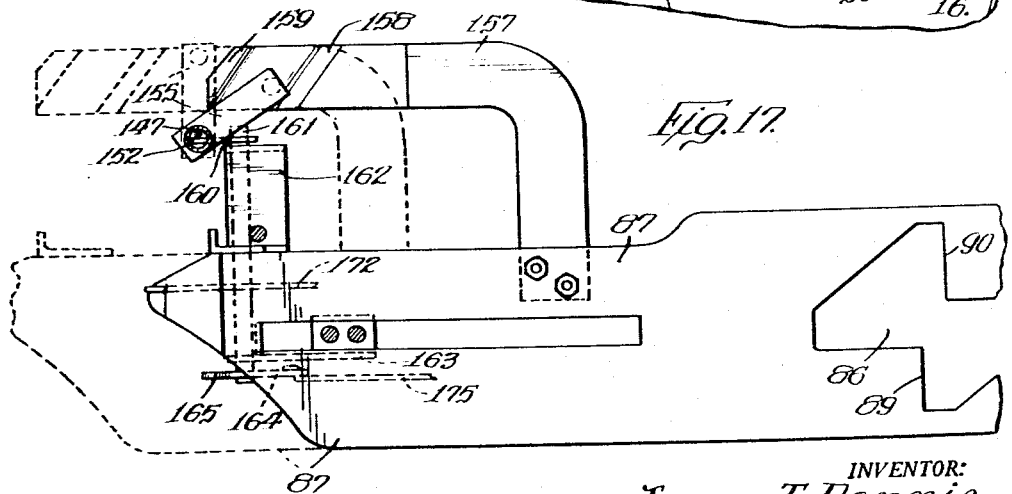

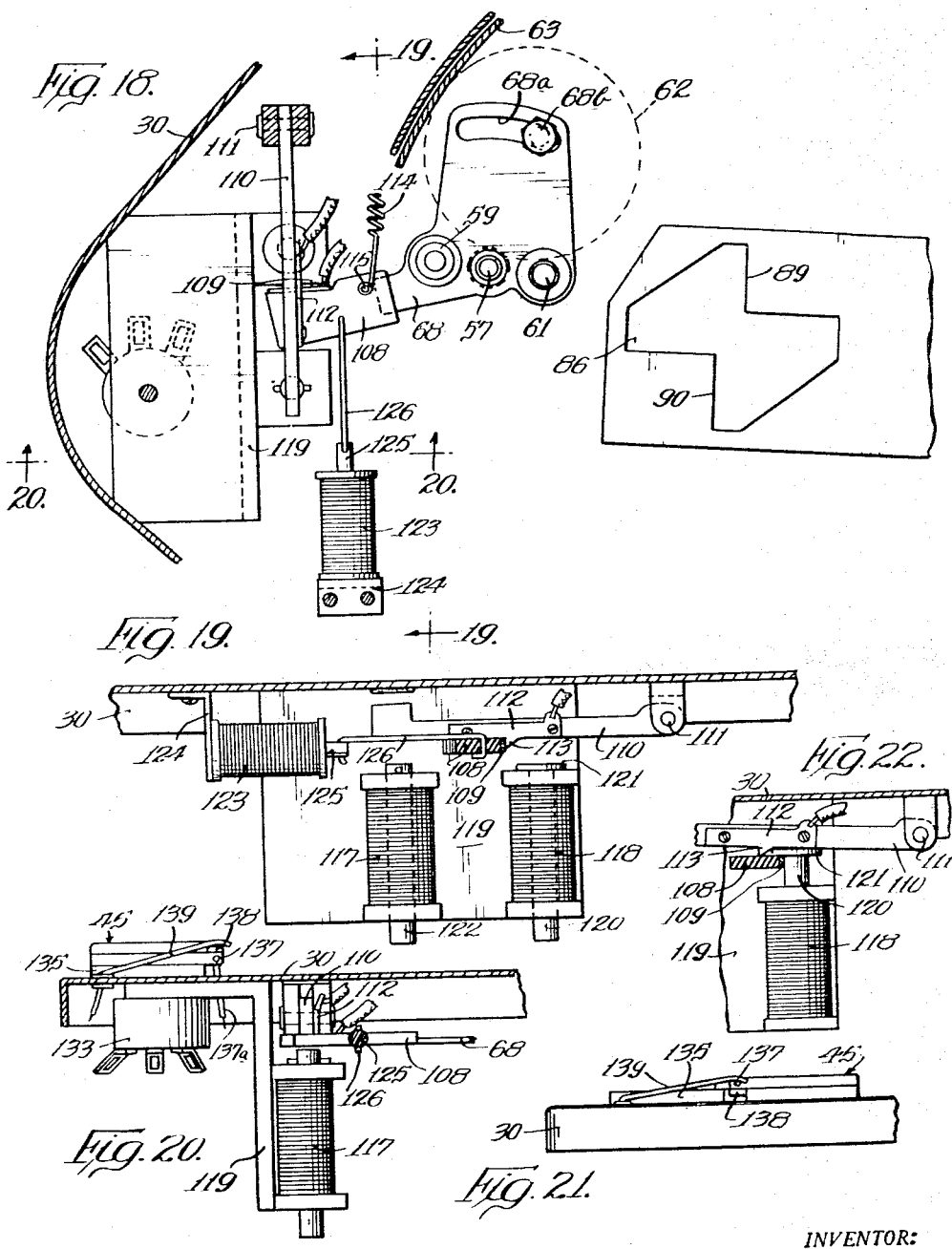

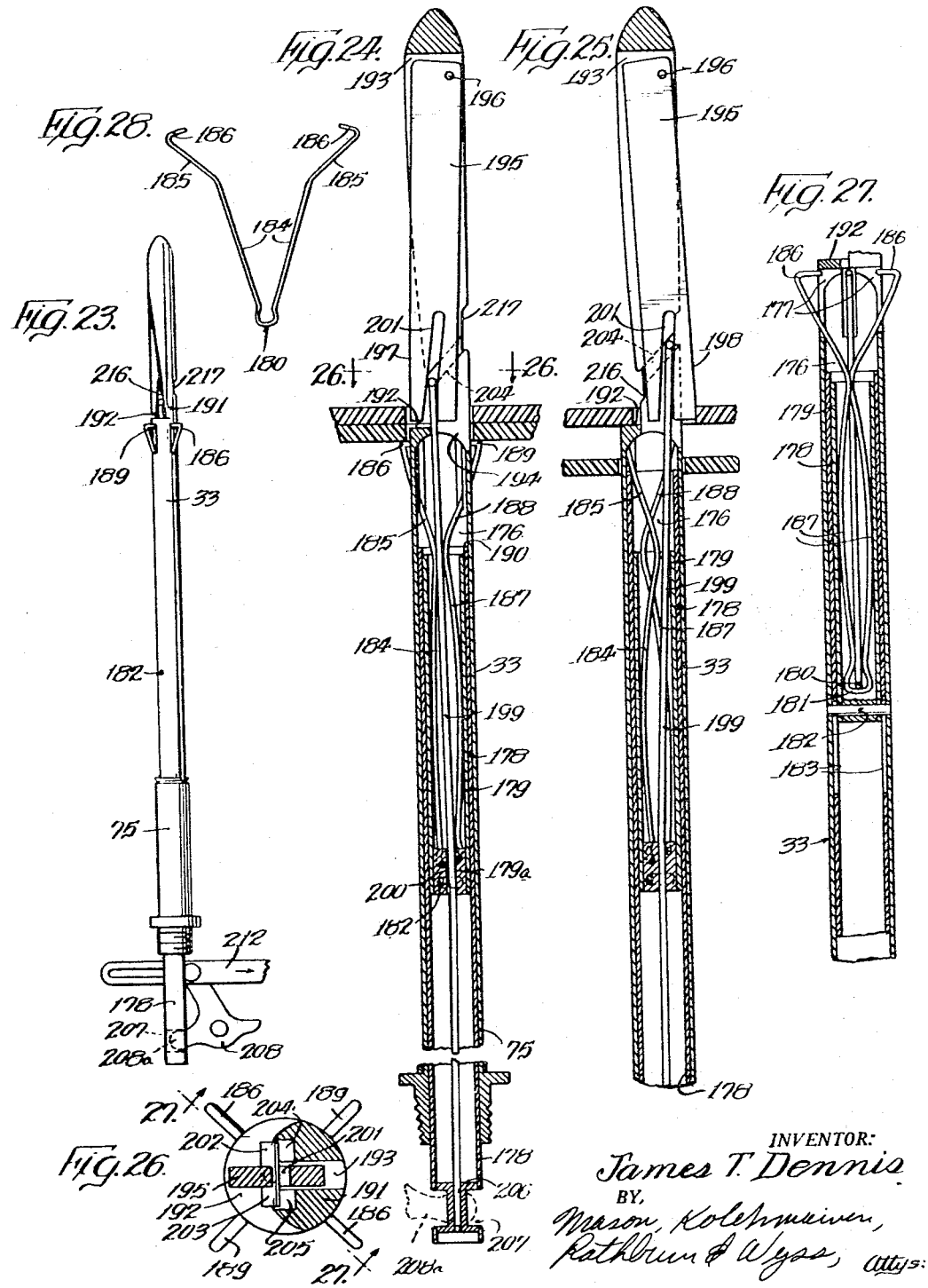

United States Patent Office 3,297,328
Patented Jan. 10, 1967

3,297,328
RECORD CHANGER
James T. Dennis, 812 American National Bldg.,
Oklahoma City, Okla. 73102
Application Apr. 18, 1962, Ser. No. 190,848, now Patent No. 3,231,282, which is a continuation of application Ser. No. 17,039, Mar. 23, 1960, now abandoned, which is in turn a division of application Ser. No. 319,975, Nov. 12, 1952, now Patent No. 2,939,714, dated June 7, 1960. Divided and this application Dec. 15, 1965, Ser. No. 513,941
6 Claims. (Cl. 274—15)

The present invention is a division of my copending application Ser. No. 190,848, said application Ser. No. 190,848 being a continuation of application Ser. No. 17,039, now abandoned, said application Ser. No. 17,039 being a division of Dennis application Ser. No. 319,975, filed Nov. 12, 1952, now issued as U.S. Patent No. 2,939,714.

The present invention relates to automatic phonograph apparatus, and, more particularly, to a new and improved automatic record changer for phonograph apparatus.

At the present time, there are a number of different types of records on the market of different sizes and having different playing speeds. Also different types of records use different centering apertures to accommodate different types of record changers. Thus, at a playing speed of 33⅓ r.p.m., 12 inch, 10 inch and 7 inch records are available with standard centering apertures; at a playing speed of 45 r.p.m., 7 inch records are available with an enlarged centering aperture and inserts are provided which can be used to adapt these records for standard centering aperture record changers; and at a playing speed of 78 r.p.m., 12 inch and 10 inch records are available with standard centering apertures. In addition to these difficulties, it is now proposed to manufacture records of undisclosed size and centering aperture at a still lower playing speed of 16⅔ r.p.m.

Since many selections are not available in each type of record, records of different types are soon collected and automatic record changers must be provided which are capable of playing records of all different sizes and speeds. However, most, if not all, of the present day record changers are automatic only in the sense that they automatically deposit records on the turntable of the record changer and position the tone arm for playing the new record and include no facilities for changing the speed of the turntable automatically. As a result, it is impossible with present day apparatus to play records of the various commercial types in intermixed sequence without making certain manual adjustments, such as adjustments for the speed of the turntable, et cetera, between each record which, of course, removes most, if not all, of the advantages of automatic operation. In addition, present day record changers which are capable of playing all three speeds of records are provided with a record changing mechanism having a record changing cycle which lasts for several revolutions of the turntable and requires a complicated and expensive gearing arrangement to permit the mechanism to be driven at a slower speed than the turntable. Such a mechanism is necessary in present day record changers, because, if the turntable is operating at 78 r.p.m. during the record changing cycle, one revolution of the turntable, i.e., less than one second, is not sufficient time in which to remove the tone arm, drop the record and position the tone arm correctly for the next record. On the other hand, a record changing cycle which is completed during one revolution of the turntable is advantageous because the record changing mechanism may be directly driven from the turntable and a much simpler and less expensive arrangement is required. Also, such an arrangement avoids excessive time lapse between records, particularly for records of slower speeds.

Accordingly, it is an object of the present invention to provide a new and improved fully automatic record changer which is adapted automatically to play records of different sizes and playing speeds in intermixed sequence.

It is another object of the present invention to provide a new and improved record changer which is adapted to play all commercial types of records in intermixed sequence and without any manual adjustments on the part of the operator.

It is still another object of the present invention to provide a new and improved record changer which is adapted to play records of different sizes and playing speeds automatically and in intermixed sequence, and wherein the record changing cycle is completed during one revolution of the turntable.

It is a further object of the invention to provide a new and improved record changer wherein the speed of the turntable is automatically controlled in accordance with the playing speed of the records deposited on the turntable.

It is a still further object of the present invention to provide a record changer which is adapted to play records of different sizes and playing speeds automatically and in intermixed sequence and wherein records can be added to the record stack at any time except during the actual record changing cycle without manually removing any clamping members or hold down mechanism from the top of the record stack.

Another object of the present invention resides in the provision of a new and improved record changer capable of playing a series of intermixed 7 inch, 10 inch and 12 inch records.

Still another object of the present invention resides in the provision of automatic speed control mechanism useful not only in record changers of the type employing a single revolution record changing mechanism, but also in other types.

A still further object of the present invention resides in the provision of a record supporting arrangement having improved and simplified construction.

It is another object of the present invention to provide a new and improved record changer which is adapted to play records of different sizes and playing speeds automatically and in intermixed sequence and wherein the record engaging elements are protected between record changing cycles to prevent damage thereto.

It is still another object of the present invention to provide a new and improved record changing mechanism which is operable during one revolution of the turntable to change records.

It is a further object of the present invention to provide a new and improved record changing mechanism wherein the turntable is operated at the slowest record playing speed during a substantial portion of each record changing cycle.

It is still a further object of the present invention to provide a new and improved record changing mechanism wherein records of several different playing speeds may be played in intermixed sequence and the turntable speed is reduced to the slowest record playing speed during a substantial portion of each record changing cycle, the inertia effects of a fully loaded turntable being compensated so that the record changing cycle is substantially uniform.

The invention, both as to its organization and method of operation, together with further objects and advantages thereof, will best be understood by reference to the following specification taken in connection with the accompanying drawings, in which:

FIG. 1 is a perspective view of a record changer embodying the features of the present invention;

FIGS. 2 and 3 are top plan views of the speed selector switch of the record changer of FIG. 1;

FIG. 5 is a bottom plan view of the record changer of FIG. 1;

FIG. 6 is a fragmentary sectional elevation taken substantially on the line 6—6 of FIG. 5;

FIG. 7 is a fragmentary bottom plan view of the portion of the record changer shown in FIG. 6, taken substantially on the line 7—7 thereof;

FIG. 10 is a fragmentary perspective view of the tone arm positioning mechanism;

FIG. 11 is a fragmentary sectional elevation on a somewhat larger scale of the portion of the record changer shown in FIG. 6 and showing the details of the record changing drive mechanism;

FIG. 12 is a fragmentary sectional elevation taken substantially on the line 12—12 of FIG. 5, showing the mechanism for controlling the record stabilizing arm and 10 inch indexing arm;

FIG. 13 is a top plan view, partly in section, taken substantially on the line 13—13 of FIG. 12 and showing the mechanism for rotating the record stabilizing arm and 10-inch indexing arm;

FIG. 14 is a fragmentary sectional elevation showing the mechanism for elevating the record stabilizing arm;

FIG. 15 is a fragmentary top plan view of the record changer of FIG. 1 showing the details of the speed control arm;

FIG. 16 is a fragmentary sectional elevation taken substantially on the line 16—16 of FIG. 15;

FIG. 17 is a fragmentary top plan view taken substantially on the line 17—17 of FIG. 16;

FIG. 18 is a fragmentary top plan view of a somewhat larger scale of the speed control mechanism shown in FIG. 4;

FIG. 19 is a fragmentary sectional elevation taken substantially on the line 19—19 of FIG. 18;

FIG. 20 is a fragmentary sectional elevation taken substantially on the line 20—20 of FIG. 18;

FIG. 21 is a fragmentary side elevational view of the speed selector switch of FIGS. 2 and 3;

FIG. 22 is a fragmentary side elevational view similar to FIG. 19 and showing the speed control latch in a different position;

FIG. 23 is a side elevation of the centering spindle mechanism employed in the record changer of FIG. 1;

FIGS. 24 and 25 are sectional elevations on a somewhat larger scale of the spindle mechanism of FIG. 23, showing the manner in which the bottom record is released;

FIG. 26 is a sectional plan view on a still larger scale taken substantially on the line 26—26 of FIG. 24;

FIG. 27 is a sectional elevation taken substantially on the line 27—27 of FIG. 26;

FIG. 28 is a plan view of one of the record supporting springs shown in unstressed position.

Figure 4:
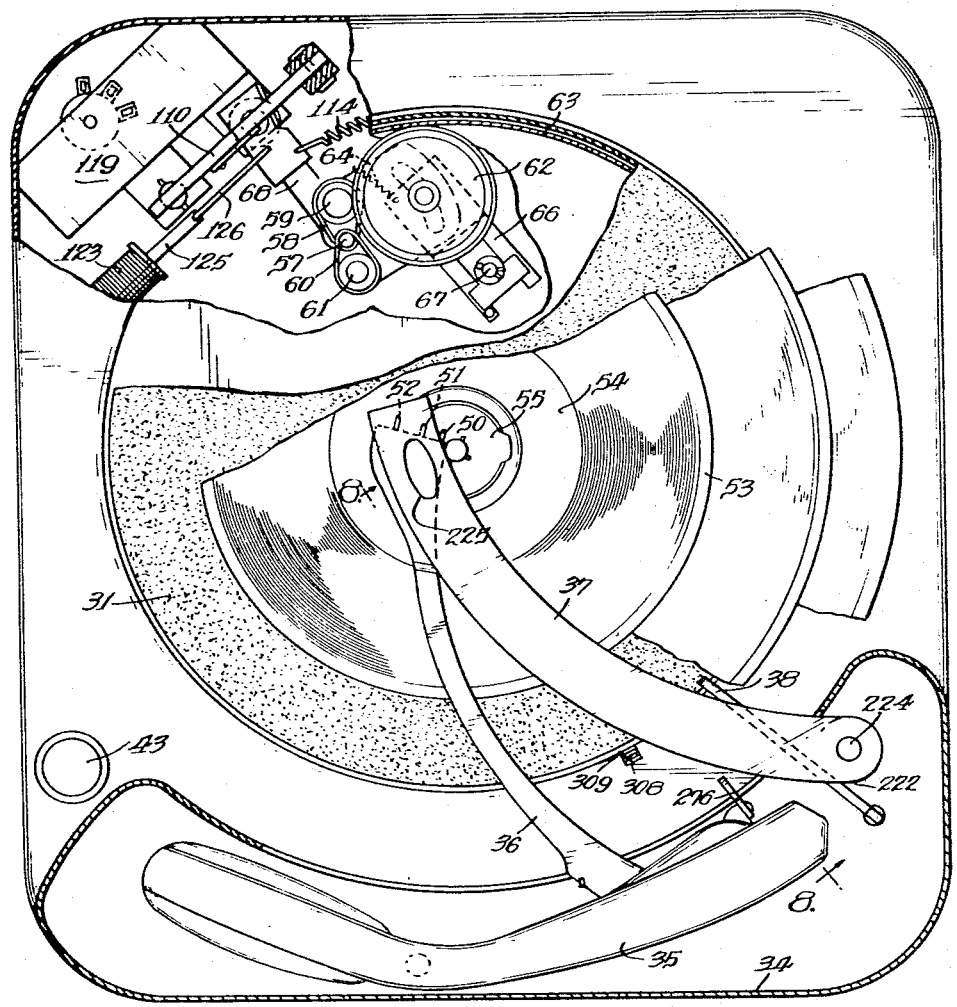
FIG. 4 is a top plan view, partly in section of the record changer of FIG. 1 with portions thereof broken away to show the speed control mechanism.

Referring now more particularly to FIGS. 1, 4 and 5 of the drawings, the record changer of the present invention is therein illustrated as comprising a base member indicated generaly at 30, on which is mounted a rotatable turntable 31, which supports the records to be played and is driven from the motor 32 (FIG. 5) by means to be described in more detail hereinafter. A centering spindle 33 is positioned at the axis of the turntable 31, and supports a stack of records in non-playing position, as will be described in more detail hereinafter. A curved housing indicated generally at 34 is provided adjacent one side of the turntable and encloses a pivotally supported tone arm 35, a speed control arm 36, a record stabilizing arm 37, and a 10-inch indexing arm 38, when these elements are in their inoperative or non-playing position. The above-described elements 35–38, inclusive, are pivotally supported within the housing 34 and may be swung into their operative positions through suitable apertures in the wall of the housing 34 nearest the turntable. Thus, the aperture 39 is provided for the speed control arm 36, the aperture 40 is provided for the tone arm 35, the aperture 41 is provided for the 10-inch indexing arm 38, and the aperture 42 is provided for the stabilizing arm 37. A control knob 43, which serves both as an on-off switch control knob and a manual reject control, is positioned on the base member 30 adjacent the housing 34. There is also provided on the base member 30 a speed control knob 44 (FIG. 3), which is covered by the cover plate 45 when automatic speed control is desired.

Briefly to consider the general mode of operation of the record changer described thus far, the records to be played may be divided into three groups, the records of each group having a different playing speed. Thus, the records of the first group may have a playing speed of 33⅓ r.p.m., the records of the second group a playing speed of 45 r.p.m. and the records of the third group a playing speed of 78 r.p.m. The record changer of the present invention is arranged to provide automatic speed control of the turntable 31 in accordance with the playing speed of the uppermost record on the turntable by employing an electrical contact portion on certain types of records, the electrical contact portion being spaced from the centering aperture of the record in accordance with the playing speed of the record and the speed control arm 36 is employed to determine the playing speed of the uppermost record on the turntable 31. In the illustrated embodiment, the turntable is driven at a speed of 33⅓ r.p.m. during a substantial portion of the record changing cycle, for reasons to be described in more detail hereinafter, so that it is unnecessary to provide any electrical contact portion for records which have a playing speed of 33⅓ r.p.m. Furthermore, the conventional 45 r.p.m. records, which have an enlarged centering aperture, may be equipped with standard metal inserts provided with a standard centering aperture, and these metallic inserts can be employed as the electrical contact portion which identifies records having a playing speed of 45 r.p.m. Accordingly, it is only necessary to adapt one type of record and provide an electrical contact portion which is spaced from the centering aperture of the record for records having a playing speed of 78 r.p.m., one such record being illustrated as the record 46 (FIG. 1) which is provided with the standard run-out groove portion 47, and the standard central portion 48, normally used for the label of the record, on which there is positioned an electrical contact portion 49.

The contact portion 49 on the record 46 may be formed in any suitable manner. For example, the portion 49, which may be annular or segmental, may be embedded in the record at the edge of the present label portion, a special label having an opening for the embedded portion may be employed, or a paper label having a metallized portion 49 thereon may be used, in which case the record is adapted by the record manufacturer. On the other hand, the record may be adapted by the record purchaser by adhesively applying a piece of metallized tape to the record in the proper position, or brushing on a metallic paint, in which cases a suitable template would be employed which can be registered with the centering aperture of the record and has an opening therein corresponding to the contact portion 49, through which opening the tape or paint may be applied to the record. In the alternative, a U-shaped clip may be slipped onto the record, the arms of the clip extending radially outwardly from the centering aperture on both sides of the record, the clip having a suitable metallic portion at the correct radial spacing when placed on the record.

The speed control arm 36 is provided with a plurality of flexible electrical contact members 50, 51 and 52, which are spaced apart radially relative to the record and are adapted to engage the center portion 48 of the record when the speed control arm 36 is moved inwardly against the spindle 33 and downwardly onto the record by means to be described in more detail hereinafter.

The electrical contact portion 49 is so spaced from the centering aperture of the record 46 that it touches and electrically connects together the contacts 51 and 52 as the turntable 31 is rotated, but does not touch the contact 50. On the other hand, a 45 r.p.m. record, such as the record 53 (FIG. 4), having a standard central label portion 54 and a standard metallic insert 55 provided with a standard centering aperture, may be uppermost on the turntable 31. In this situation, the contacts 50 and 51 are electrically connected together through the metallic insert 55, but the outermost contact 52 on the speed control arm 36 does not touch the insert 55 and, hence, is not connected to the contacts 50 and 51. Accordingly, when a 78 r.p.m. record is placed on the turntable, the contacts 51 and 52 are connected together through the electrical contact portion 49 on these records and when a 45 r.p.m. record is placed on the turtable, the contacts 50 and 51 are electrically connected together through the metal insert 55. When a 33⅓ r.p.m. record is placed on the turntable, no electrical contact portion is provided on these records so that none of the contacts 50, 51 and 52 are electrically connected together.

At the start of the record changing cycle, which is initiated by movement of the tone arm 35, as will be described in more detail hereinafter, the tone arm 35 is lifted from the record and moved clear of the turntable 31 and through the aperture 40 into the housing 34. At the same time, the speed control arm 36 is moved clear of the turntable 31, through the aperture 39 and into the housing 34. While this is taking place, the stabilizing arm 37 is moved outwardly into engagement with the spindle 33 and downwardly into engagement with the top one of the records which are supported in non-playing position on the spindle 33, as best illustrated in FIG. 12. At the same time, the 10-inch indexing arm 38 is moved out of the aperture 41 and positioned beneath the stack of records supported on the spindle 33.

With the tone arm 35 and the speed control arm 36 clear of the turntable 31, i.e., positioned in the housing 34, the bottom one of the record supported on the spindle 33 is released, by means to be described in more detail hereinafter, and guided onto the turntable 31. The speed control arm 36 is then moved inwardly against the spindle 33 and the tone arm 35 is moved inwardly to the correct position for beginning the new record. As the tone arm 35 is lowered to engage the run-in groove of the top record on the turntable 31, the speed control arm 36 is also lowered into engagement with the central portion of the top record. The speed of the turntable 31 is reset during each record changing cycle to 33⅓ r.p.m. so that the turntable 31 rotates at this speed for a substantial portion of the record changing cycle. If the top record on the turntable 31 is a 33⅓ r.p.m. record, there is no electrical contact portion at the center of this record and none of contacts 50, 51 and 52 are connected together so that the turntable 31 continues to rotate at a speed of 33⅓ r.p.m. for the duration of the record. If the top record is a 78 r.p.m. record, the contacts 51 and 52 are connected together through the contact portion 49 as soon as the speed control arm 36 is lowered into engagement with the central portion of the record and an electrical circuit is provided which responds to connection of the contacts 51 and 52 together by changing the speed of the turntable 31 from 33⅓ r.p.m. to 78 r.p.m. before the stylus on the tone arm 35 engages the sound track of the 78 r.p.m. record. On the other hand, if the top record is a 45 r.p.m. record, the contacts 50 and 51 are connected together through the metal insert 55 and a different electrical circuit is provided which responds to connection of the contacts 50 and 51 together by changing the speed of the turntable 31 to 45 r.p.m. before the stylus on the tone arm 35 engages the sound track of the 45 r.p.m. record.

Preferably, the speed control arm 36 is lifted off the record after the record changing cycle so as to decrease the drag on the uppermost record and eliminate any noise due to scraping of the contacts over the surface of the record. Also, by lifting the speed control arm, wear on the paper label portion of the record is avoided. At the end of the record changing cycle, the stabilizing arm 37 is moved upwardly out of engagement with the top one of the records supported in non-playing position and is retracted within the housing 34, since it is not required during the playing cycle. Likewise, the 10-inch indexing arm 38, which is employed to determine the positioning of the tone arm 35 for 10 inch records as will be described in more detail hereinafter, is not required during the playing cycle and is withdrawn into the housing 34 at the end of the record changing cycle. With this arrangement, the unplayed records are supported solely on the spindle 33 during the playing cycle and records may be added to this stack at any time except during the actual record changing cycle.

*Driving mechanism for turntable and record changing mechanism*

Considering now in more detail the manner in which the turntable 31 is driven and the drive mechanism for the record changing apparatus of the changer, it has been previously pointed out that the record changing cycle may conveniently be completed during one revolution of the turntable in the record changer of the present invention since the speed of the turntable is reduced to 33⅓ r.p.m. for substantially the entire portion of the record changing cycle. Accordingly, it is desirable to provide a drive mechanism for the record changing mechanism which operates directly from the turntable and is completely cycled during one revolution of the turntable. However, it will be understood that, insofar as the automatic speed control mechanism of the present invention is concerned, any conventional drive means may be employed to actuate the record changing mechanism.

Referring now more particularly to FIGS. 4, 5, 6, 7, 9 and 11, the motor 32, which is energized from any suitable source, such as the conventional 110 volt A.C. source, under the control of the on-off switch 56, is provided with a drive shaft 57 (FIG. 4), the drive shaft 57 being connected through the belt 58 to an idler shaft 59 and through the belt 60 to an idler shaft 61. An idler wheel 62 is biased into engagement with the inner surface of the rim 63 of an auxiliary turntable 31a by means of the spring 64 which also acts to bias the wheel 62 into engagement with a particular one of the drive shafts 57, 59 or 61, the idler wheel 62 being supported on a sliding plate 66 which is pivoted at 67 so as to permit the wheel 62 to connect any one of the three drive shafts to the rim 63 and cause rotation thereof.

When the turntable 31 is fully loaded and is being driven at a speed of 78 r.p.m. just prior to the record changing cycle, the reduction in speed of the turntable to 33⅓ r.p.m. during the record changing cycle is opposed by the inertia effect of the fully loaded turntable with the result that the turntable is not slowed down for the first portion of the record changing cycle and the record changing mechanism is operated above normal speed for this portion of the record changing cycle. In order to avoid this difficulty and reduce wear on the record changing mechanism, there is provided, in accordance with the present invention, the auxiliary turntable 31a which is positioned beneath the turntable 31. The turntable 31a is adapted to drive the turntable 31 in the proper direction, but if the turntable 31a is slowed down, the turntable 31 is disengaged therefrom and coasts until it has slowed down to the speed of the turntable 31a. Thus, the turntable 31a is provided with a plurality of ratchet portions 31b which are spaced about the center of the turntable 31a and are adapted to engage the pawl 31c supported on the underside of the turntable 31. The pawl 31c normally rests on the surface of the turntable 31a and one of the portions 31b engages this pawl when the turntable 31a is rotated in the clockwise direction as viewed from the top so that the turntables 31 and 31a are driven together from the motor 32. However, if the speed of the turntable 31a is reduced during the record changing cycle, the turntable 31 is permitted to coast relative to the turntable 31a, since the pawl 31c rides over the ratchet portions 31b, until the two turntables are again turning at the same speed, at which time the pawl 31c is again engaged by one of the portions 31b and the turntable 31 is driven in direct ratio to the table 31a again.

In the position shown in FIG. 4 of the drawings, the idler wheel 62 is in engagement with the drive shaft 59 so as to rotate the turntable at a speed of 45 r.p.m. The drive shafts 59 and 61 are carried on a motor control arm 68 which pivots about the axis of the main drive shaft 57 so as to bring the idler wheel 62 into engagement with either the main drive shaft 57, in which case, the turntable is driven at 78 r.p.m., or into engagement with the drive shaft 61, in which case, the turntable is driven at 33⅓ r.p.m. In accordance with the present invention, movement of the motor control arm 68 is effected under the control of the speed selector arm 36 by means to be described in more detail hereinafter.

The base member 30 is provided with a central depressed portion 69 (FIG. 6) which is adapted to receive the turntables 31a and 31. A sub-assembly member 70, preferably in the form of a casting, is secured to the portion 69 of the base member 30 and supports the record changing mechanism. More particularly, the sub-assembly member 70 includes a series of four posts 71 which extend downwardly from the plate portion of the member 70 around the spindle 33 and carry a supporting plate 72 which is secured to the ends of the posts 71 by means of the screws 74. The supporting plate 72 is provided with a central aperture which receives the threaded end portion of the shank 75 at the bottom end of the spindle 33 and a hexagonal nut 73 rigidly connects the shank portion 75 to the supporting plate 72 at the center thereof with the spindle correctly positioned for cooperation with the stabilizing arm 37 as will be described in more detail hereinafter. A tubular control member 178 of the spindle 33 projects downwardly from the shank portion 75 and is controlled during the record changing cycle by means to be described in more detail hereinafter.

The subassembly member 70 is provided with a boss portion 77 which supports the central hub 78 of the turntable 31a through the bearing 79 so that the turntable 31 is mounted for rotation on the boss portion 77 and may be driven from the edge thereof as described heretofore. An idler wheel 80 is mounted on the supporting plate 72 concentric with the shank portion 75 of the spindle and is adapted to rotate freely about the shank portion 75. Positioned immediately above the hub of the idler wheel 80, there is provided an open face gear 81 which is also concentric with the shank portion 75 and is supported on the hub of the idler wheel 80 and is adapted for rotation with respect thereto. However, the upper hub portion 82 of the open face gear 81 is keyed to the hub 78 of the turntable 31a by means of the key 83 so that the open face 81, which may be called the driving gear, is directly connected to the central hub 78 of the turntable 31a and rotates with this turntable in direct ratio thereto.

The turntable 31 is provided with a hub 31d which is seated on the upper surface of the turntable 31a adjacent the shank 75 and the shank portion 75 is provided with a suitable keeper 84 (FIG. 11) which may be removed so that the turntable 31 may be lifted off and the turntable 31a moved out of engagement with the hub 82 and lifted off the spindle 33. The hub 31d and the upper surface of the turntable 31a have sufficient friction therebetween to slow down the turntable 31 from 78 r.p.m. to 33⅓ r.p.m. before the tone arm stylus engages the sound portion of the record being changed. Each record added to the turntable increases the turntable's inertia as well as the friction between turntables so that the slow-down period for turntable 31 is about the same regardless of its load. However, it will be understood that any other suitable means may be employed to permit the turntable 31 to coast during the changing cycle and yet be slowed down sufficiently to be driven by the turntable 31a before the stylus engages the sound portion of the record being changed. It will also be understood, that the turntable 31a may be provided with large openings in the outer portions thereof to reduce the weight thereof and amount of metal required, as will be evident to those skilled in the art. This reduction of weight will also reduce the inertia of turntable 31a.

The idler wheel 80 is interconnected by suitable crank means with a reciprocal cycling slide 87 which is slidably supported beneath the idler wheel 80 in grooves formed in the inner edges of the supporting posts 71. Thus, the idler wheel 80 carries a crank pin 85 on the under side thereof, which extends through an irregularly shaped opening 86 in the cycling slide 87. The slide 87 is provided with a series of dimpled portions 88 which engage the upper surface of the supporting plate 72 to reduce friction between these members as the slide 87 is reciprocated. As the idler wheel 80 is rotated, the crank pin 85 engages the transverse edge portion 89 of the opening 86 in the slide 87 so that the slide is moved away from the spindle 33 during the first half revolution of the idler wheel 80. During the second half revolution of the idler wheel 80, the crank pin 85 engages the transverse edge portion 90 of the opening 86 so as to return the cycling slide 87 to its initial position.

In order to drive the idler wheel 80 directly from the turntable 31a, there is provided the interconnecting pawl 91 (FIG. 11) which is supported on the upper surface of the idler wheel 80 and is adapted for pivotal movement about the horizontal pivot pin 92 so that the end portion 93 of the pawl 91 can engage the open face teeth of the driving gear 81. The rear portion of the pawl 91 is sufficiently heavy that the end portion 93 thereof is tilted up into engagement with the driving gear 81 when the pawl is released. Movement of the pawl 91 is controlled by means of the escape mechanism 95 which is supported at the center thereof on the post 96, forming a part of the subassembly member 70. More particularly, the escape mechanism 95 comprises a plate-like arm 97 (FIG. 7) which is provided with a hook portion 98 adapted to engage the inclined upper edge of the pawl 91 and in the position shown in FIGS. 7 and 11, the hook portion 98 holds the pawl 91 out of engagement with the driving gear 81. The other arm of the escape mechanism 95 comprises a plate-like member 100 and the arms 97 and 100 are made integral with a sleeve member 101 which is rotatably supported on the shank portion of a supporting screw 102 which is threaded into the post 96. Accordingly, the arms 97 and 100 are rigidly connected together so as to operate as a true bell crank lever and the arm 100 is provided with a rubber cover post 103 which extends upwardly from the end of the arm 100 and is adapted to engage a projection 104 on the periphery of the driving gear 81 for each revolution of this gear. The arm 97 is connected to an upper trip slide 106 through the rod 107 and the trip slide 106 is moved in the direction away from the spindle 33, by means to be described in more detail hereinafter, when it is desired to initiate the record changing cycle.

When the trip slide 106 is moved away from the spindle 33, the escape mechanism 95 is pivoted so as to move the hook portion 98 thereof out of engagement with the pawl 91 and permit the end portion 93 of the pawl to engage the open face gear 81. Accordingly, the idler wheel 80 is directly connected to the driving gear 81 and, hence, the turntable 31a for one rotation of this turntable. When the idler wheel has been rotated part of one revolution the slide 106 is moved back to the position shown in the drawings in which position the hook portion 98 is adapted to engage the pawl 91. Accordingly, as the idler wheel completes one full revolution, the pawl 91 is disengaged from the driving gear 81 so as to terminate movement of the idler wheel 80 and, hence, movement of the cycling slide 87.

Automatic speed control mechanism

Considering now the details of the automatic speed control mechanism by means of which the speed of the turntable 31 is automatically changed in accordance with the playing speed of the uppermost record on the turntable, it will be recalled from the above general description that electrical circuits are provided to control the position of the motor control arm 68 and these electrical circuits are, in turn, controlled by the contacts 50, 51 and 52 on the speed control arm 36.

Referring now more particularly to FIGS. 1 to 5, inclusive, and 15 to 21, inclusive, of the drawings, the motor control arm 68 is provided with an extension arm 108 (FIG. 18), preferably of insulating material. One edge of the extension member 108 is recessed to receive an electrical contact plate 109, and a latch member 110, which is pivotally secured to the under side of the base member 30 by means of the pivot pin 111, is positioned above the extension arm 108 and is provided with a metal contact plate 112 on one side thereof, the plate 112 being provided with a detent shoulder 113 adapted to engage the contact portion 109 on the extension arm 108 when the latch 110 is in a substantially horizontal position as best illustrated in FIG. 19. A spring 114 is connected at one end thereof to a projection 115 on the extension arm 108 and is connected at the other end thereof to a post 116 supported on the base member 30. Accordingly, when the latch 110 is moved upwardly so as to disengage the detent 113 from the contact portion 109, the spring 114 moves the motor control arm 68 in a clockwise direction about the main drive shaft 57, as viewed in FIG. 18, to shift the driving wheel ratio and hence the speed of the turntable 31. In the position shown in FIG. 18, the motor control arm 68 is in the 33⅓ r.p.m. position wherein the drive shaft 61 contacts the idler wheel 62. When the motor control arm is shifted so that the main drive shaft 57 contacts the idler wheel 62, the turntable is driven at a speed of 78 r.p.m. and, when the motor control arm 68 is shifted to the position shown in FIG. 4 wherein the drive shaft 59 contacts the idler wheel 62, the turntable is driven at a speed of 45 r.p.m.

In order to release the latch 110 and control the movement of the motor control arm 68 in accordance with the playing speed of the uppermost record on the turntable, there is provided a pair of solenoids 117 and 118, which are mounted vertically on a bracket 119 supported on the under side of the base member 30. The core 120 of the solenoid 118 is provided with a flange 121, preferably of insulating material, and the core 120 is normally positioned within the solenoid 118 with the flange 121 thereof resting against the top of the solenoid coil form when the solenoid 118 is deenergized. Upon energization of the solenoid 118, the core 120 is moved upwardly so that the flange portion 121 thereof strikes the latch member 110 and moves this member upwardly by a sufficient amount to disengage the detent 113 from the contact portion 110 and permit the spring 114 to move the motor control arm 68 in the righthand direction, as viewed in FIG. 19. However, the contact portion 109 strikes the upper end of the core 120 adjacent the flange portion 121 thereof, as shown in FIG. 22, and the motor control arm 68 is positioned so that the main drive shaft 57 contacts the idler wheel 62 and the turntable is rotated at a speed of 78 r.p.m. It will, therefore, be evident that when the solenoid 118 is energized, the motor control arm is actuated to the 78 r.p.m. position. It will also be noted that the flange 121 on the upper end of the core 120 engages the extension arm 108 and prevents the core from dropping back to its deenergized position after the solenoid is deenergized so that the motor control arm 68 remains in its 78 r.p.m. position for the duration of the record and until it is reset at the start of the next record changing cycle.

If the solenoid 117 is energized, the core 122 thereof is moved upwardly so as to strike the outer end of the latch member 110 and disengage the detent 113 from the contact portion 109. When this occurs, the motor control arm 68 is moved in the righthand direction, as viewed in FIG. 19, until one end of the slot 68a engages the stud 68b on the motor base, in which position the drive shaft 59 contacts the idler wheel and the turntable is rotated at a speed of 45 r.p.m. It will be noted that since the solenoid 118 is not energized, the core 120 thereof does not interfere with the movement of the motor control arm to the 45 r.p.m. position.

In order to reset the motor control arm to the 33⅓ r.p.m. position at substantially the beginning of the record changing cycle, so that the record changing mechanism may be operated at a speed of 33⅓ r.p.m. during the record changing cycle, there is provided means for resetting the motor control arm and positioning the detent 113 in front of the contact portion 109 so as to hold the motor control arm 68 in its 33⅓ r.p.m. position until one of the solenoids, 117 or 118, is energized. More specifically, a third solenoid 123, which is mounted on a bracket 124 supported on the under side of the base member 30, is provided with a core 125 which is connected to the extension arm 108 through the control rod 126. When the solenoid 123 is energized, the the core 125 thereof is moved in the lefthand direction, as viewed in FIG. 19, so that the force of the spring 114 is overcome and the control arm 68 is moved back until the other end of the slot 68a engages the stud 68b, in which position the arm 68 is in its normal, or 33⅓ r.p.m. position.

Figure 29:
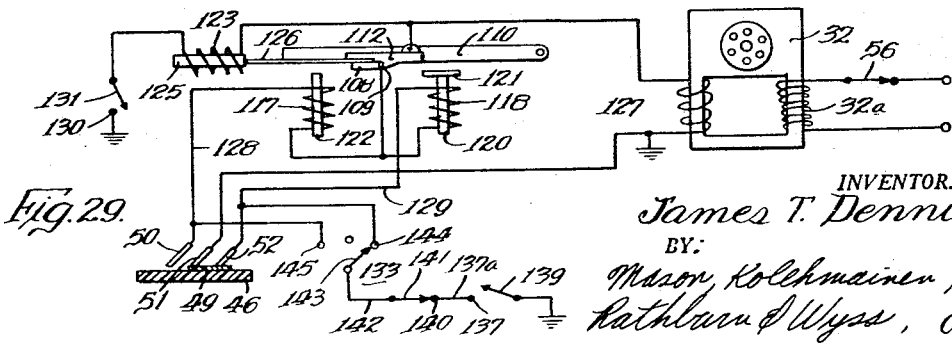
FIG. 29 is an electrical diagram of the speed control circuits of the record changer of FIG. 1.
Figure 8:
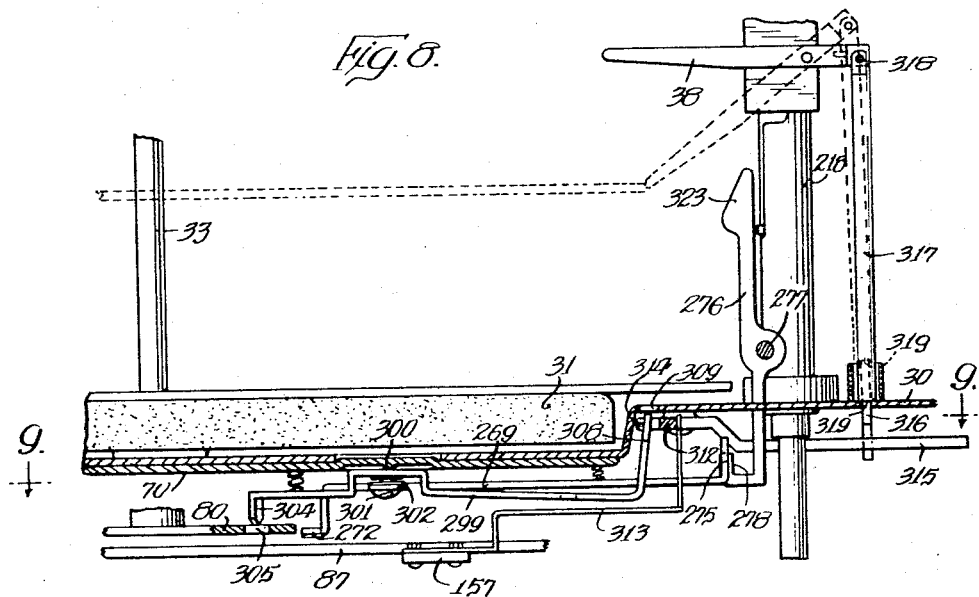
FIG. 8 is a fragmentary sectional elevation taken substantially on the line 8—8 of FIG. 4.
Figure 9:
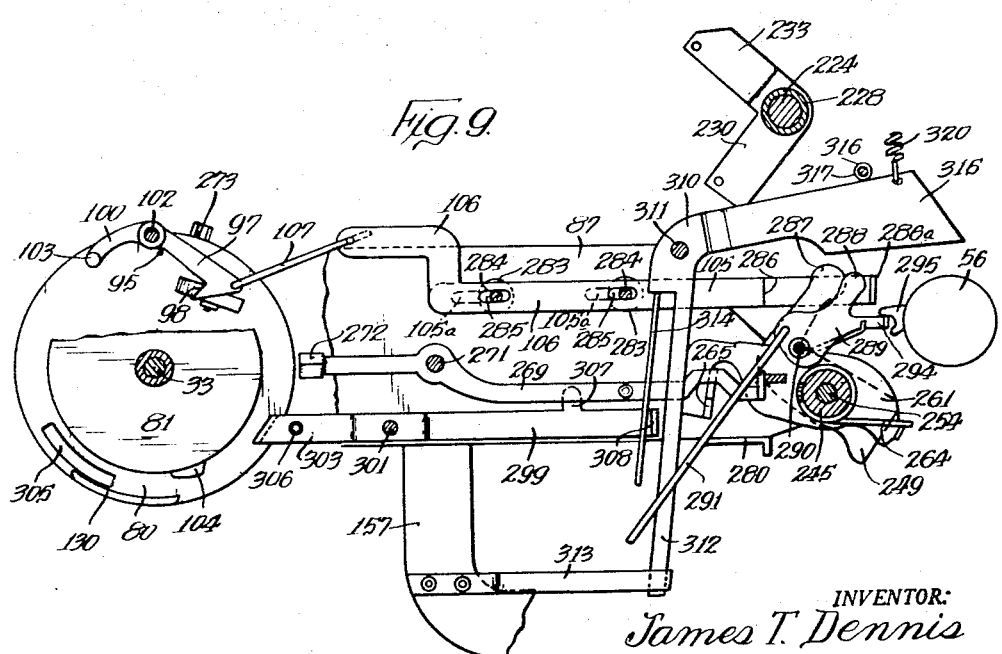
FIG. 9 is a fragmentary top plan view taken substantially on the line 9—9 of FIG. 8.

Considering now the details of the electrical circuits employed to energize the solenoids, 117, 118 and 123, these electrical circuits are shown in the schematic diagram of FIG. 29 wherein the solenoids 117, 118 and 123, are illustrated schematically together with certain mechanical features of the latching mechanism. In order to provide power to actuate the solenoids, there is provided a winding 127 which is positioned on the core of the synchronous motor 32 on top of the main winding 32a thereof, so that a separate transformer to supply power for the solenoids is not required. The winding 127 is provided with a sufficient number of turns to induce a relatively small voltage across this winding when the motor 32 is energized.

One side of the winding 127 is connected to ground, i.e., the base member 30, and the other end of the winding 127 is connected to the contact portion 112 carried by the latch member 110. The contact portion 109 on the arm 108 is connected to one end of the solenoids 117 and 118. The other end of the solenoid 117 is connected over the wire 128 to the contact 50 carried by the speed control arm 36, and the other end of the solenoid 118 is connected over the wire 129 to the contact 52 carried by the speed control arm 36. The center contact 51 on the speed control arm 36 is connected to ground, i.e., the base member 30. The ungrounded end of the winding 127 is also connected to one end of the solenoid 123, the other end of this solenoid being connected to a flexible contact arm 131 which is supported by, and insulated from, a bracket 132 secured to the supporting plate 72 (FIG. 7). A projecting cam portion 130, on the periphery of the idler wheel 80, connects the contact arm 131 to ground as shown as the idler wheel 80 starts to rotate at the beginning of the record changing cycle. The cam portion 130 is of sufficient length to insure that the solenoid 123 is actuated properly and is short enough to permit speed changes during the latter portion of the record changing cycle.

From the foregoing description, it will be evident that when a 78 r.p.m. record, such as the record 46, is uppermost on the turntable, the contacts 51 and 52 are electrically connected together through the metallic contact portion 49 on this record so that an electrical circuit is completed from the winding 127 to the solenoid 118 over a path which includes the contact portions 109 and 112 and the contacts 51 and 52. As soon as the solenoid 118 is energized, the core 120 thereof is moved upwardly so as to strike the latch 110 and permit the motor control arm to move into engagement with the core 120 beneath the flange 121 thereof as shown in FIG. 22. In this position, the turntable is driven at a speed of 78 r.p.m. as described in detail above. If a 45 r.p.m. record, such as the record 53, is uppermost on the turntable, the contacts 50 and 51 are electrically connected together through the metal insert 55 on this record so that an electrical circuit is completed from the winding 127 to the solenoid 117 over a path which includes the contact portions 109 and 112 and the contacts 50 and 51. When the solenoid 117 is energized, the core 122 thereof is moved upwardly so that it strikes the latch 110 and permits the motor control arm to move to the 45 r.p.m. position. At the start of the next record changing cycle, the contact arm 131 is grounded so that the solenoid 123 is energized from the winding 127 and the core 125 is attracted into the solenoid 123 so as to move the motor control arm back to its 33⅓ r.p.m. position, in which position the motor control arm is held by means of the detent 113. The cores 120 and 122 of the solenoids 118 and 117, respectively, are then returned to their denergized positions by gravity; or, if desired, by suitable spring return means.

In the event that manual control of the speed of the turntable is desired, the automatic speed control mechanism described in detail above may be utilized in conjunction with a manually actuable speed selector switch so that the speed of the turntable may be adjusted by the operator. More particularly, there is provided the speed selector switch 133, which is mounted on the supporting bracket 119 and the shaft 134 of the switch 133 is connected to a flat speed control knob 44 which is positioned above an indicator plate 135 of insulating material which is supported on the top of the base member 30. A cover plate indicated generally at 45 is employed to cover the speed selector knob 44 during periods when automatic speed control is desired, and there is also provided means responsive to opening of the cover plate 45 for connecting the manual selector switch 133 into the circuit. More particularly, the cover plate 45 is supported on a central supporting block 135 of insulating material by means of the hinge pin 137, the hinge pin 137 being positioned beneath an extension portion 138 on the cover plate 45. A spring contact arm 139, one end of which is connected to the base member 30, is positioned on top of the extension portion 138 when the cover plate 45 is closed and the hinge pin 137 is electrically connected by means of the wire 137a to a stationary contact 140 (FIG. 5) which is carried by, and insulated from, the base member 30. A flexible contact arm 141, which is insulatingly supported on the cycling slide 87 and moves therewith, is connected by means of the wire 142 to the movable contact 143 of the speed selector switch 133.

The speed selector switch 133 is provided with three positions. In the 78 position, as shown in FIG. 3, the movable contact 143 is connected to the fixed contact 144 of the selector switch 133; in the center position, the movable contact 143 is not connected to any circuit; and in the 45 position, the movable contact 143 is connected to the fixed contact 145 of the selector switch 133. The contact 144 is connected to the wire 129 and, hence, to the contact 52 carried by the speed control arm 36, and the contact 145 is connected by way of the wire 128 to the contact 50 on the speed control arm 36.

Considering now the manner in which the operation of the record changer may be changed from automatic speed control to manual speed control, it is first pointed out that when the cover plate 45 is closed, the flexible contact arm 139 is not connected to the hinge pin 137 so that the selector switch 133 is not connected into the circuit. However, if manual speed control is desired, the cover plate 45 is raised and as this member is opened, the portion 138 on the cover plate is moved out from beneath the end of the arm 139 to permit the contact arm 139 to be connected to the hinge pin 137. Accordingly, the movable contact 143 on the speed selector switch 133 is connected to ground through the contacts 140, 141 and 137, 139 so that either one of the solenoids 117 or 118 is energized in accordance with the setting of the speed selector switch 133. As a result, the latch member 110 is controlled in the manner described above to permit the motor control arm 68 to be shifted to the correct position as selected by the speed selector switch 133.

In order that the setting of the manual speed control switch cannot affect the speed of the turntable 31 during the record changing cycle, the contacts 140 and 141 are provided. When the cycling slide 87 is in its normal position, the contacts 140 and 141 are closed so that a manual speed change may be accomplished by adjustment of the speed selector switch 133. However, as soon as the record changing cycle is initiated and the slide 87 is moved away from the center spindle 33 by means of the above-described driving mechanism, the contacts 140 and 141 are opened and these contacts remain open until the record changing cycle is substantially completed and the carriage slide 87 is returned to its normal position. With this arrangement, adjustment of the speed selector switch 133 and opening and closing of the cover plate 45 has no effect upon the automatic speed control mechanism, since the contacts 140 and 141 are open during the record changing cycle and prevent the selector switch from being inserted into the automatic speed control circuit.

It will also be noted that the contact portions 109 and 112 are connected together only during periods when the motor control arm is in the 33⅓ r.p.m. position and when the latch 110 is lifted by the core of either one of the solenoids 117 or 118, the connection between the contact portions 109 and 112 is broken so that the solenoid is only energized momentarily and subsequent energization of the solenoids is not possible until the motor control arm is reset to its 33⅓ r.p.m. position.

In connection with the above-described automatic speed control system, it will be understood that any suitable cycling slide drive mechanism may be employed insofar as the speed control mechanism itself is concerned. Thus, a conventional record changing mechanism wherein the cycling slide is driven at a reduced speed relative to the turntable may be employed in which case it is not necessary to drive the turntable at the lowest speed of 33⅓ r.p.m. during the entire record changing cycle. Accordingly, with a record changing mechanism which requires several revolutions of the turntable to complete a cycle, the solenoid 123 need not be employed to reset the motor control arm 68 at the start of the record changing cycle, but instead the arm 68 may be reset mechanically during the record changing cycle by means of a suitable connection to the cycling slide. For example, if the cycling slide 87 is driven by a conventional mechanism as described immediately above, the arm 68 may be connected to the slide 87 by means of a control wire 100a, shown in dotted lines in FIG. 5, which is connected at one end to the motor control arm 68 and extends around an idler wheel 100b supported on the base member 30. The wire 100a is provided with an eye portion 100c within which is positioned the V-shaped end of a control wire 100d connected to the extension arm 157 on the cycling slide 87. When the slide 87 has been moved to its outermost position, i.e., at approximately the middle of the record changing cycle, the wires 100d and 100a are connected together and the arm 68 is reset to its 33⅓ r.p.m. position where it is held by means of the detent 113. However, it will be understood that the arm 68 is preferably reset at the start of the record changing cycle when a single revolution record changing mechanism such as described in detail above is used, since, with this arrangement, the turntable is rotated at the lowest speed during substantially the entire record changing cycle while permitting automatic playing of records of different speeds in intermixed sequence.

It will be understood that various combinations of manual and automatic speed control can be employed in playing intermixed records of two different speeds. For example, the cover plate 45 may be left open with the knob 44 set at the 78 r.p.m. position and the described record changing mechanism will play 45 r.p.m. records and 78 r.p.m. records intermixed without any contact portion on the 78 r.p.m. records. Thus, if a 45 r.p.m. record is uppermost on the turntable 31 the solenoid 117 will be energized by electrically connecting contacts 50 and 51 through the metal insert of the 45 r.p.m. record before the contacts 140 and 141 are closed at the end of the changing cycle. Thus the speed is changed to 45 r.p.m. in the exact same manner described above in connection with thte fully automatic speed changing operation. However, if a 78 r.p.m. record without a contact portion 49 is uppermost on the turntable, no electrical connection can be made from the record. Thus, when the contacts 140 and 141 are closed at the end of the changing cycle the manual speed control is employed and electrically changes the speed to 78 r.p.m. by means of solenoid 118 energized through the manual circuit.

It will be understood that with the cover plate 45 opened and the uppermost record on the turntable 31 having a metal portion for determining the speed of said record, the speed of said record will be determined by the metal portion rather than the setting of the manual speed control. Any record not having a metal contact portion and being uppermost on the turntable 31 will have its speed controlled by the setting of the manual control only. Any record not having a metal contact portion and being uppermost on the turntable 31, and the cover plate 45 being closed, the speed of that record will remain at 33⅓ r.p.m., as described in automatic speed control.

It will be obvious that other combination of manual and automatic speed adjustments may be employed as desired. Also it will be understood that the principles of the present invention may be extended to provide automatic intermixed record playing with four or more record playing speeds, it being only necessary to provide properly spaced contact portions on the record and contacts on the speed control arm 36 and additional solenoids to control movement of the motor control arm 68, as will be readily understood by those skilled in the art.

*Mechanism for controlling movement of speed control arm*

Considering now the mechanism which is provided to move the speed control arm 36 during the record changing cycle, it will be recalled that the speed control arm 36 is positioned adjacent the spindle 33 at the center of the record during the playing cycle with the contacts 50, 51 and 52 thereof lifted off of the uppermost record on the turntable 31. After the record changing cycle is initiated, the speed control arm 36 is moved off of the record and into the housing 34 so as to permit the next record to be deposited onto the turntable. The speed control arm 36 is then swung inwardly against the spindle 33 and is lowered onto the central portion of the record at substantially the same time that the tone arm 35 engages the run-in groove of the top record on the turntable 31. In this connection, it will be understood that the movements of the speed control arm 36 must be coordinated with movement of the tone arm 35 so that these arms do not interfere with one another during the record changing cycle and during the playing of the record. It will also be understood that these arms may be on different sides of the turntable so that they may be operated independently of one another. For example, the tone arm 35 may be actuated from one side of the cycling slide 87 and the speed selector arm 36 actuated from the other side of the slide 87, as will be well understood by those skilled in the art.

Referring now more particularly to FIGS. 15, 16 and 17 of the drawings, the speed control arm 36 is supported on a mounting bracket 146 carried on the upper end of a hollow tubular supporting post 147, the post 147 being rotatably and slidably mounted within a hollow supporting member 148 which latter member is secured to the base member 30 of the record changer. The bracket 146 is provided with a pair of upstanding ear portions 149 and 150, which support, a pivot pin 151 which extends transversely through the speed control arm 36 at a point inside the supporting member 148. The weight of the forward portion of the speed control arm 36 is sufficient to cause the arm 36 to fall onto the top record and the arm 36 may be lifted off of the record by means of a control rod 152 which extends upwardly through the center of the supporting post 147 and through the end of the speed control arm 36 and is provided with a head portion 153 adapted to engage the top surface of the speed control arm 36. Accordingly, the speed control arm 36 may be lifted off the record by exerting a downward force on the control rod 152 while restraining the post 147 against downward movement, the amount by which the speed control arm is lifted being limited by the stop 154 on the bracket 146 which prevents further downward movement of the control rod 152 relative to the bracket 146. Beneath the base member 30 there is provided the arm 155 which is rigidly secured to the supporting post 147 and is provided with a downwardly projecting cam follower 156 at the extremity thereof. Movement of the cam follower 156 about the axis of the post 147 is effected by the projecting member 157 which is secured to the cycling slide 87 and is provided with a cam slot 158 extending transversely across the projecting member 157 and a mitered corner portion 159 adapted to engage the cam follower 156.

In order to control up and down movement of the control rod 152, there is provided a first control arm 160 which is connected to the bottom end of the control rod 152 and is secured at the other end thereof to a supporting shaft 161 which extends transversely across the cycling slide 87. The shaft 161 is supported at one end thereof by a bracket 162 which is secured to the sub-assembly plate 70, and is supported at the other end on a bracket 163 which is also secured to the sub-assembly plate 70. On the other end of the shaft 161 there is provided a control arm 164 which is also rigidly secured to the shaft 161 so that the control arms 160 and 164 and the shaft 161 form a bell crank lever arrangement in which pivotal movement of the control arm 164 causes up and down movement of the control rod 152. The control arm 164 is provided with a camming portion 165 which is adapted to engage the bottom surface of the cycling slide 87 as the slide is reciprocated during the record changing cycle.

In order to prevent wear on the paper label of the record, drag on the record and scraping noise on the record which may arise when the contacts 50, 51 and 52 on the speed control arm 36 remain on the record, there is provided means for lifting the tone arm off of the record after the record changing cycle has been completed. More specifically, there is provided a suitable dashpot arrangement which, in the illustrated embodiment, includes a cylinder 166 (FIG. 5) supported on the supporting plate 72 by means of the bracket 167. Within the cylinder 166 there is provided a spring operated piston provided with a hollow piston rod 168 and valve means 169 on the outer end of the piston rod for controlling the flow of air from the discharge end of the hollow piston rod 168. The described dashpot may, for example, be substantially as shown and described in U.S. Patent No. 2,207,189, although it will be understood that any other suitable dashpot having the desired time delay may be employed.

With this dashpot arrangement, when the piston rod is moved away from the cylinder 166, air is admitted to the high pressure side of the cylinder and when the piston rod 168 is released, the spring operated piston is urged inwardly, the rate of travel of the piston being determined by the valve arrangement 169 at the outlet end of the hollow piston rod 168. The piston rod 168 is withdrawn from the cylinder 166 by means of a lost motion linkage including the control wire 170, which is secured to the piston rod 168 and is provided with a transverse eye portion 171 at the end thereof, and a U-shaped control wire 172 which extends through the eye portion 171 and is connected at the other end thereof to the cycling slide 87. A second control wire 173 is also connected to the piston rod 168 and is provided with a transverse eye portion 174 within which there is positioned a U-shaped control wire 175 which is connected to the end of the control arm 164.

Considering now the operation of the above-described mechanism for controlling the speed control arm 36, it is assumed that the speed control arm 36 is in the position shown in full lines in FIG. 16 at the time a record changing cycle is initiated. As the cycling slide 87 is moved away from the axis of the turntable 31, the cam follower 156 engages the cam slot 158 in the member 157 and the control arm 155 is pivoted from the position shown in full lines in FIG. 17 to the position shown in dotted lines therein. Since the control arm 155 is rigidly secured to the supporting post 147, rotation of the control arm 155 causes the speed control arm 36 to be moved clear of the turntable 31 and positioned within the housing 34. As soon as the cycling slide 87 starts to move away from the axis of the turntable at the start of the record changing cycle, the camming portion 165 of the control arm 164 engages the bottom surface of the slide 87 so as to prevent upward movement of the control rod 152 and, hence, lowering of the forward end of the speed control arm 36. However, when the record changing cycle is substantially completed so that the camming portion 165 no longer engages the slide 87, the control rod is permitted to move upwardly, due to the weight of the forward portion of the speed control arm 36 so that the contacts 50, 51 and 52 on the control arm 36 are lowered into engagement with the top record as the speed control arm 36 is moved to the position shown in dotted lines in FIG. 16.

During the initial portion of the record changing cycle, the control wire 172 which is connected to the slide 87 transmits a pulling force through the control wire 170 to the piston 168 so as to withdraw the piston from the cylinder 166. As the piston 168 is withdrawn, the linkage 173, 175 is slackened. However, the camming portion 165 of the arm 164 immediately engages the slide 87 to prevent the speed control arm 36 from falling onto the record at this point in the record changing cyle. After the cycling slide 87 has been moved to its outer limit of travel, it is returned to its initial position so as to complete the record changing cycle. However, the return motion of the slide 87 is not transmitted to the piston 168 due to the lost motion linkage 170 and 171. Accordingly, the piston 168 returns at a relatively slow rate to its closed position. During the last portion of the closing travel of the piston 168, the eye portion 174 of the control wire 173 engages the control wire 175 and moves the control arm 164 toward the axis of the turntable so that the control rod 152 is moved downwardly and the speed control arm 36 is lifted off of the record.

In this connection, it will be understood that the time required for the piston to close sufficiently for the linkage 173, 175 to become operative may be adjusted by the valve 169. Preferably, the linkage 173, 175 is not effective to lift the speed control arm 36 off of the record until several seconds after the record changing style is completed. Also, any other suitable means may be employed instead of the described dashpot arrangement to lift the speed control arm 36 off of the record after the record changing cycle is completed. Thus, a suitable mechanical or electrical counter arrangement can be employed to lift the arm 36 by counting a predetermined number of revolutions of the turntable after the record changing cycle is completed and then actuating the lift mechanism. However, the described dashpot arrangement has been found to be conveniently simple in its operation and very satisfactory for the purpose. It will also be understood that the extension member 157 and arm 155 are sufficiently flexible in the vertical direction to permit the cam follower 156 to engage the cam slot 158 during movement of the speed control arm while permitting the cam follower 156 to ride out of the slot 158 during the other portions of the record changing cycle. With this arrangement, the speed control arm 36 is held off of the record during the entire record changing cycle while this arm is moved off of the record and then returned to its normal position at the center of the turntable.

*Record supporting and releasing mechanism*

Considering now the manner in which a stack of records is supported on the centering spindle 33 and the bottom record is released onto the turntable 31 during each record changing cycle, and referring to FIGS. 23 to 28, inclusive, of the drawings, the centering spindle 33 is provided with a central bore 176 which extends upwardly through the spindle to substantially the record supporting level of the spindle, and a plurality of slots 177 are provided in the side walls of the spindle which communicate with the central bore 176 therein. A tubular control member 178 is slidably positioned within the bore 176 and an inner sleeve 179 is positioned within the control member 178.

In order to support a stack of records on the centering spindle 33, there is provided a pair of generally U-shaped spring wire members indicated generally at 180 and 181, in intersecting right angle planes positioned within the inner sleeve 179 and rigidly fixed within the sleeve 179 by any suitable means, such as a solder connection 179a, or the like. The inner sleve 179 is held in fixed relation to the spindle 33 by means of the pin 182 which extends through aligned openings in the spindle 33 and the inner sleeve 179 and the slots 183 in the control member 178. The spring wire members 180 and 181 are provided with outwardly inclined upper portions which extend through the slots 177 and terminate in inturned end portions which form record supporting shoulders adapted to engage the edges of the centering aperture in the bottom record of the stack. More particularly, the arms 184 of the spring wire member 180 are provided with the outwardly inclined upper portions 185 which terminate in inturned end portions 186 which form oppositely disposed record supporting shoulders. In a similar manner, the arms 187 of the spring wire member 181 are provided with outwardly inclined upper portions 188 which terminate in inturned end portions 189 which form oppositely disposed record supporting shoulders which are displaced ninety degrees from the record supporting shoulders 186. When the control member 178 is moved upwardly, the upper edge 190 thereof engages the inclined upper potrions 185 and 188 of the spring wire members 180 and 181 and moves the end portions 186 and 189 thereof inwardly to release the bottom record of the stack.

In order to support the remainder of the records while the bottom record is being released, the spindle 33 is provided with a portion 191 of reduced diameter which defines a shelf 192 positioned just slightly less than the thickness of one record above the record supporting level of the record supporting shoulders 186 and 189. The upper portion of the spindle 33 is also provided with a transverse slot 193 therethrough which extends from the tip of the spindle down to the shelf 192 and the bottom portion 194 of the slot 193 extends below the shelf 192 and communicates with the bore 176. A control blade 195 is pivotally supported within the slot 193 at the upper end thereof by means of the pivot pin 196. In the position shown in FIG. 24, the edge 197 of the control blade 195 is positioned substantially in alignment with the periphery of the spindle 33 and extends over the shelf 192 so as to direct records onto the record supporting shoulders 186 and 189. In the other position of the control blade shown in FIG. 25, the edge 198 of the control blade 195 is moved beyond the periphery of the spindle 33 and engages the records in the stack, other than the bottom record thereof, and moves these records laterally onto the shelf 192. When the control blade 195 is moved back to its original position, the edge 197 thereof engages the other side of the centering apertures of the records positioned on the shelf 192 and moves these records off of the shelf and permits the lowermost record to move downwardly onto the record supporting shoulders 186 and 189. With this arrangement, a relatively small force is required to shift the records laterally since all but the bottom record are moved as a unit and the control blade 195 is not dependent upon the thickness of the record for proper operation.

In order to move the control blade 195 from the first to the second of the above-described positions in timed relation to upward movement of the control member 178, there is provided a control rod 199 which extends upwardly through an aperture 200 in the solder connection 179a within the inner sleeve 179, through the bottom portion 194 of the slot 193 and into a slot 201 in the control blade 195. Cooperating camming means are provided on the control rod 199, the control blade 195 and the spindle 33 for moving the control blade 195 from one position to the other in response to upward and downward movement of the control rod 199. More particularly, the upper end of the control rod 199 is provided with a T-shaped head having the projecting arm portions 202 and 203 which act as cam followers and engage a pair of cam slots 204 and 205 which are formed in the upper portion of the spindle 33 adjacent to and in communication with the sides of the slot 193 and extend transversely through the spindle at an angle relative to the longitudinal axis thereof. As the control rod 199 is moved upwardly, the cam follower portions 202 and 203 thereof follow the cam slots 204 and 205 and move the upper end of the control rod 199 laterally from the position shown in FIG. 24 to the position shown in FIG. 25. Since the upper end of the control rod 199 is positioned within the slot 201 in the control blade 195, the control blade 195 is likewise pivoted about the pin 196 from the position shown in FIG. 24 to the position shown in FIG. 25 as the control rod is moved upwardly.

Considering now the manner in which the movement of the control blade 195 is correlated with the movement of the record supporting shoulders 186 and 189, it will be understood that the control blade 195 must be actuated slightly ahead of the record supporting shoulders 186 and 189 so that the second record from the bottom is moved laterally onto the shelf 192 before the shoulders 186 and 189 have been withdrawn sufficiently to permit the bottom record to drop. The bottom end of the control rod 199 is secured to the bottom end of the tubular control member 178 by any suitable means, such as the solder joint indicated at 206, and the control rod 199 is so positioned relative to the control member 178 that the control rod moves upwardly into the cam slots 204 and 205 a sufficient amount to pivot the control blade 195 so that the second record from the bottom moves onto the shelf 192 before the upper edge 190 of the control member 178 engages the outwardly inclined portions 185 and 188 of the wire members 180 and 181, and the record supporting shoulders 186 and 189 are cammed inwardly by an amount sufficient to permit the bottom record to drop, so that the second record and the records stacked thereon are supported on the spindle 33 in non-playing position while permitting the bottom record to drop onto the turntable 31. The control rod 199 and the tubular control member 178 are thus moved upwardly from the position shown in FIG. 24 to the position shown in FIG. 25 during the first half of the record changing cycle.

During the last half of the record changing cycle, the control rod 199 and control member 178 are moved downwardly in unison so that the edge 197 of the control blade 195 engages the opposite side of the centering aperture of the record positioned on the shelf 192 and moves this record laterally off the shelf. At the same time, and just slightly before the record is moved off the shelf, the tubular control member 178 is moved downwardly so as to permit the record supporting shoulders 186 and 189 to move outwardly through the slots 177 and the record which is moved off of the shelf 192 by the edge 197 drops down onto the extended record supporting shoulders 186 and 189, as do the other records on the record stack.

In order to move the control member 178 and control rod 199 during the record changing cycle and in accordance with the movement of the cycling slide 87, the tubular control member 178 is provided with a notch 207 in the bottom end thereof which is adapted to receive the end portion 208a of a bell crank lever. The bell crank lever 208 is supported on a bracket 209 (FIG. 6) which is secured to the mounting plate 72 by means of the screws 210. The bell crank lever 208 is provided with an offset arm 211, the end of which is slidably secured to a control arm 212 by means of the connecting stud 213. The control arm 212 is pivotally secured to the bracket 214 which is supported on and moves with the cycling slide 87.

At the start of the record changing cycle, the slide 87 is moved away from the axis of the turntable by means of the above-described single revolution drive mechanism. However, during the first portion of the record changing cycle, the stud 213 moves within the slot 215 in the control arm 212 so that the bell crank lever 208 is not actuated until the stud 213 engages the end of the slot 215. During the next portion of travel of the slide 87 away from the axis of the turntable, the bell crank lever 208 is pivoted about its axis so as to move the end portion 208a thereof upwardly and cause actuation of the record supporting and record releasing mechanism in the manner described in detail above. Accordingly, the bottom record is dropped onto the turntable and the second record moved onto the shelf 192 during the latter portion of the first half of the record changing cycle, during which time the slide 87 is moved away from the axis of the turntable. As the slide 87 is returned to its initial position, the bell crank lever is not actuated until the stud 213 engages the other end of the slot 215, at which time the bell crank lever is pivoted back to its initial position during which time the control sleeve 178 and control rod 199 are returned to their original positions, thereby completing the record changing cycle. If desired, a spring (not shown) may be positioned between the solder joints 179a and 206 within the tubular member 178 to bias the member 178 downwardly and facilitate return of the member 178 to its normal record supporting position. However, it will be noted that the spindle mechanism places a relatively light load on the record changing mechanism and, hence, is particularly suitable for a single revolution record changing mechanism, in which case the above-described biasing spring may not be desirable from the standpoint of the additional loading on the changing mechanism.

From the foregoing description, it will be understood that certain variations, due to manufacturing tolerances, assembly and the like, will arise in the mechanism for moving the control member 178 up and down and it is important to provide a spindle mechanism which does not have positive stops at either the upper or lower limit of the control mechanism so that variations in the amount of movement imparted to the control mechanism do not jam the mechanism and cause injury to the parts thereof. In the spindle mechanism of the present invention, allowance for variations in the up and down movement of the control member 178 and the control rod 199 is provided so that it is virtually impossible to jam the spindle mechanism and cause the record suporting and record releasing mechanism to become inoperative. Thus, the record supporting position of the record supporting shoulders 186 and 189 is determined by the relative positioning of the inner sleeve 179 and the spindle 33 so that the outwardly inclined portions 185 and 188 of the wire members 180 and 181 engage the bottom ends of the slots 177 in the record supporting position of these members and downward movement of the tubular member 178 has no effect upon the record supporting position of these members so that downward clearance of the tubular member 178 is provided. Upward clearance of the tubular member 178 is provided since the upper edge 190 of the control member 178 may continue to move upwardly beyond the position at which the record supporting shoulders 186 and 189 are retracted sufficiently to permit the bottom record to drop. In fact, the tubular member 178 may be moved upwardly by an amount sufficient completely to enclose the shoulders 186 and 189, if desired, so that a substantial clearance in the upward direction of movement of the control member 178 is provided.

In a similar manner, additional movement in the downward direction of the control rod 199 is permitted by providing the notched portion 216 (FIG. 25) in the portion 191 of the spindle 33, and additional motion of the control rod 199 in the upward direction is permitted by providing the notched portion 217 on the other side of the spindle 33. Accordingly, the cam followers 202 and 203 on the end of the control rod 199 may be moved up and down within the notched portion 216, which communicates with the bottom end of the cam slots 204 and 205, without producing any substantial lateral movement of the control blade 195. In a similar manner, the cam followers 202 and 203 may move up and down in the notch 217, which communicates with the upper ends of the cam slots 204 and 205, without producing any substantial lateral movemnt of the control blade 195. It will also be understood that the position of the control rod 199, relative to the control member 178, may be adjusted as desired so that proper clearances for the travel of both of these members is provided during the upward and downward movement of these members in unison. In the alternative, the control rod 199 and control member 178 may be controlled by separate mechanisms, in which case, suitable timing means would be employed so as to correlate the up and down movement of these members to effect the above-described record changing cycle.

From the foregoing description, it will be seen that the spindle mechanism of the present invention may be simply and easily constructed and assembled by low cost production methods. Thus, the bore 176 is formed in the spindle 33 by a suitable drilling operation, the slots 177 therein are formed by a simple transverse milling operation in two directions and the slot 193 is also formed by a suitable milling operation. The shelf portion 192 and notches 216 and 217, are conveniently formed by a suitable milling operation or, in the alternative, the upper portion of the spindle 33 may be cast in its final form. The inclined cam slots 204 and 205 are then formed by a suitable end milling operation to complete the spindle proper.

Assembly of the spindle parts is accomplished by first positioning the control rod within the bore 176 with the cam followers 202 and 203 thereof positioned within the cam slots 204 and 205, after which the slot 201 in the control blade 195 is slid onto the end of the control rod 199 and the pivot pin 196 fixed in place. At a sub-assembly position, the spring wire members 180 and 181 are positioned at right angles within the inner sleeve 179 and secured therein by means of the solder connection 179a and the opening 200 is then drilled through the solder connection to receive the bottom end of the control rod 199 and the opening for the pin 182 is drilled transversely through the sleeve 179 and joint 179a. The inner sleeve assembly is then slid onto the bottom end of the control rod 199 and into the tubular control member 178, and the pin 182 is inserted through these members so as to position the upper ends of the wire members 180 and 181 correctly. The bottom end of the control rod 199 is then secured to the bottom end of the control member 178, the bushing assembly 75 is secured to the bottom end of the spindle and the spindle assembly is ready to be inserted into the record changer.

*Mechanism for moving record stabilizing arm*

Considering now the details of the mechanism provided for moving the record stabilizing arm 37, it will be recalled from the general description that the record stabilizing arm 37 is moved outwardly through the aperture 42 in the housing 34 to a point over the spindle 33 and downwardly into engagement with the top record supported on the spindle 33 during a portion of the record changing cycle, and, after the bottom record has been released onto the turntable 31, the arm 37 is moved upwardly off of the spindle 33 and returned to its initial position within the housing 34.

It will be understood from the previous description of the record supporting and releasing mechanism that the stack of records is normally supported on the equally spaced record supporting shoulders 186 and 189 without additional support means so that records may be added to or taken from the stack as desired at any time during the playing cycle. However, when the second record from the bottom is shifted onto the shelf 192, it is desirable to provide a stabilizing arm which rests on the top of the record stack to prevent the records from tilting. Such a record stabilizing arm has been found desirable when a single 12 inch record remains on the spindle 33 since the record on the shelf 192 may, under these conditions tilt sufficiently to be released onto the turntable when it is shifted laterally back to the axis of the spindle 33 if no stabilizing arm is provided. In this connection, it will be understood that the position of the shelf 192 on the spindle 33 is correlated with the position of the record stabilizing arm 37 so that the shelf 192 is on the side of the spindle nearest to the record stabilizing arm. The arm 37 preferably extends over the spindle 33 and engages the top record on both sides of the spindle so that tilting of the record stack is positively prevented.

Referring now more particularly to FIGS. 5, 12, 13 and 14 of the drawings, a tubular supporting member 218 is supported on the base member 30 within the housing 34 by any suitable means such as the supporting block 219, and a tubular sleeve 220, which is provided with a flange portion 221 at the bottom end thereof and supports the member 222 on the upper end thereof, is rotatably positioned within the tubular supporting member 218 with the bottom edge of the member 222 resting on the upper edge 223 of the supporting member 218. A center post 224 is positioned within the tubular sleeve 220 and carries at the upper end thereof the record stabilizing arm 37 which is provided with a central aperture 225 (FIG. 4) in the outer end thereof through which the upper end of the spindle 33 may extend when the record stabilizing arm 37 is lowered onto the top record supported on the spindle. The center post 224 is provided with a transverse guide pin 226 which extends through aligned vertical slots in the tubular supporting member 218 and the tubular sleeve 220. The vertical slot in the tubular member 218 is provided with an enlarged upper portion which defines a horizontal shelf portion 227 on which the guide pin 226 may rest when the stabilizing arm 37 is in its rest position within the housing 34.

In order to move the stabilizing arm 37 outwardly over the spindle 33 and downwardly into engagement with the top record, there is provided means controlled by the record changing mechanism for rotating the center post 224. More particularly, a bushing 228 is secured to the center post 224 beneath the base member 30 and carries a bell crank lever 229 thereon. The bell crank lever 229 is provided with an arm 230, and a spring 231 is connected from the end of the arm 230 to a supporting stud 232 on the base member 30. The bell crank lever 229 is also provided with an arm 233 which is offset below the arm 230, and a spring 234 is connected from the end of the arm 233 to the end of an extension arm 235 carried by the cycling slide 87.

In order to lift the stabilizing arm 37 off of the record stack and permit it to be retracted within the housing 34, there is provided a toggle actuated control arm 236 which is pivotally supported on a bracket 237 secured to the central portion 69 of the base member 30, the end of which is adapted to engage the bottom end of the center post 224. An over center spring 238 is secured at one end to the pin 239 on the bracket 237 and at the other end to the pin 240 on the control arm 236, the pin 240 moving within the notch 241 provided in the bracket 237. An actuating arm 242, which is secured to the slide 87 and extends transversely therefrom in offset relation thereto, is adapted to engage the notch 243 in the toggle control arm 236 as the cycling slide 87 is reciprocated during the record changing cycle so that the end of the control arm 236 engages the bottom end of the center post 224 and raises the record stabilizing arm 37.

Considering now the operation of the above-described mechanism for moving the record stabilizing arm 37 during the record changing cycle, when the record changing cycle is initiated the guide pin 226 is positioned on the shelf 227 and the spring 234 is under tension so that the arm 37 is held in its uppermost position within the housing 34. As the cycling slide 87 starts to move away from the axis of the turntable, tension is removed from the spring 234 and the spring 231, which is a somewhat weaker spring than the spring 234, exerts a force on the end of the arm 230 so as to rotate the center post 224 and move the arm 37 outwardly over the centering spindle 33. When the guide pin 226 has been moved beyond the horizontal shelf 227 and against the edge 227a of the vertical slot in the member 218, the center post 224 falls of its own weight until the record stabilizing arm 37 engages the top record of the record stack supported on the spindle 33. At the same time that tension is removed from the spring 234, the actuating arm 242 engages the notch 243 in the toggle control arm 236 and moves this arm from the position shown in FIG. 14 to the position shown in FIG. 12, in which latter position the center post 224 is permitted to fall of its own weight and the arm 37 engages the top record, as described above.

After the first half of the record changing cycle is completed and the bottom record is released onto the turntable 31, the cycling slide 87 is moved back toward the axis of the turntable and, as this is done, the spring 234 is tensioned since the extension arm 235 is carried by, and moves with, the slide 87. However, tensioning of the spring 234 does not at this time produce rotation of the center post 224 since the guide pin 226 thereon is positioned within the aligned vertical slots in the tubular supporting member 218 and the tubular sleeve 220. When the cycling slide 87 has been returned a sufficient distance to cause the actuating arm 242 thereon to engage the notch 243, the control arm 236 is moved upwardly against the bottom end of the center post 224 and raises the record stabilizing arm 37 off of the spindle 33. When the center post 224 has been raised a sufficient amount, the guide pin 226 is positioned within the enlarged opening in the member 218 which defines the horizontal shelf 227 and the spring 234 then causes the center post 224 to be rotated from the position shown in full lines in FIG. 13 to the position shown in dotted lines therein, in which latter position the arm 37 is positioned within the housing and the pin 226 is positioned on the shelf 227. The movement of the record stabilizing arm 37 is then completed and the arm 37 remains at rest until the next record changing cycle. The supporting member 222 pivotally supports the 10-inch indexing arm 38 and since the supporting member 222 is secured to the sleeve 220 and the guide pin 226 extends through a vertical slot in the sleeve 220, when the center post 224 is rotated in the manner described above, the ten-inch indexing arm 38 is moved in unison therewith so that it is correctly positioned to engage the edge portion of a 10-inch record during the record changing cycle. The manner in which the arm 38 operates to position the tone arm 35 correctly for 10-inch records will be described in more detail hereinafter.

*Mechanism for moving the tone arm*

Considering now in more detail the mechanism provided for moving the tone arm 35 during the record changing cycle, it will be recalled from the general description that the tone arm 35 is lifted off of the record at the start of the record changing cycle and is swung outwardly beyond the turntable 31 and into the housing 34 to permit the next record to be deposited onto the turntable. The tone arm 35 is then swung inwardly and positioned correctly for beginning the next record. In order that records of different sizes and playing speeds may be intermixed and played automatically, there is provided means for positioning the tone arm 35 correctly to start either a 7-inch, 10-inch or 12-inch record, as will be described in more detail hereinafter, so that the operation of the record changer is fully automatic. However, it will be understood that insofar as the mechanism for moving the tone arm 35 is concerned other than the mechanism for automatically positioning the tone arm correctly at the start of the record, any suitable mechanism may be provided for lifting the tone arm up and down and swinging it back and forth across the record, and the mechanism presently described is shown merely for purposes of illustration.

Referring now more particularly to FIGS. 6 to 10, inclusive, of the drawings, the tone arm 35 is supported on hollow supporting post 244 positioned within the housing 34 and preferably formed integral with the sub-assembly member 70. More specifically, the tubular tone arm pivot shaft 245 is positioned within the supporting post 244 and carries at the upper end thereof a tone arm support bracket 246 provided with the offset tone arm pivot 2 which pivotally supports the end of the tone arm 35. The pivot shaft 245 is provided with a collar 248 below the mounting bracket 246 which rests on the top of the supporting post 244 and is provided with a tone arm lever 2 at the bottom end thereof which is secured thereto means of the nut 250. Accordingly, the tone arm 35 may be pivoted about the axis of the supporting post 244 by movement of the tone arm lever 249 beneath the base member 30. The weight of the tone arm 35 is counterbalanced by means of the spring 251 which is connected at one end of the bracket 246 and at the other end to an adjustment bracket 252 which may be adjusted longitudinally of the tone arm 35 by means of the screw 253 to provide for correct needle pressure.

In order to raise and lower the tone arm 35, there is provided an elevating rod 254 which extends through the pivot shaft 245 and engages a hexagonal height adjustment nut 255 positioned on a mounting bracket 256 carried by the tone arm 35. The mounting bracket 256 also supports a suitable cartridge (not shown) provided with a suitable stylus 257 adapted to engage the grooves of a record positioned on the turntable 31. The stylus 257 is preferably of suitable design to track properly records of different groove size so that records of different playing speeds may be intermixed. In this connection, it will be understood that the cartridge is connected by suitable wire connections (not shown) to a suitable reproduction apparatus as will be understood by those skilled in the art. The elevating rod 254 is provided at the bottom end thereof with a "C" washer 258, and a thrust spring 259 is positioned between the nut 250 and the "C" washer 258. The bottom end of the rod 254 also engages the tip of an inclined portion 260 on the cycling slide 87.

A tone arm return lever 261 is rotatably positioned on the pivot shaft 245 above the tone arm lever 249 and is provided with the openings 262 which are adapted to receive corresponding dimples 263 in the tone arm lever 249 when this lever is urged upwardly during the record changing cycle. The tone arm return lever 261 is normally urged in a clockwise direction, as viewed from the top of the supporting post 244, by means of the coil spring 264, and is provided with an upstanding portion 265 having a plurality of notches 266, 267 and 268 therein for positioning the tone arm 35 for different sizes of records.

A selector lever 269 is pivotally supported on a stud 270 formed integral with the subassembly member 70, by means of the screw 271, and is provided with an offset finger 272 positioned adjacent the idler wheel 80. The idler wheel 80 carries a tab member 273 which extends beyond the periphery of the wheel 80 and is adapted to engage the upper surface of the finger 272 when the idler wheel 80 is rotated. The selector lever 269 is provided at the other end thereof with a notch portion 274 (FIG. 10) which is adapted to engage one of the notches 266 to 268, inclusive, on the upstanding portion 265 of the tone arm return lever 261, and the selector lever 269 is also provided with an offset latch portion 275. A 12-inch indexing lever 276 is pivotally supported on the supporting post 244 by means of the pivot 277 and is provided at the bottom end thereof with a generally U-shaped latch portion 278, the end of which is adapted to engage the latch 275 on the selector lever 269 during one portion of the record changing cycle. A spring 279 normally urges the latch portion 278 away from the axis of the turntable.

In order to rotate the tone arm lever 249 and the tone arm return lever 261, there is provided an upstanding flange 280 on the cycling slide 87 which is adapted to engage the notches 281 and 282 in the tone arm lever 249 and the tone arm return lever 261 respectively, as the cycling slide is moved away from the axis of the turntable during the record changing cycle.

The upper trip slide 106 is frictionally supported on a lower trip slide 105 which is supported on the posts 283, formed integral with the subassembly member 70, by means of the studs 284 which extend through the slots 285 in the trip slide 106 and the slots 105a in the trip slide 105. The trip slide 105 is provided with an offset portion 286, the end 286a of which is adapted to be engaged by the end portion 287 of the tone arm lever 249 as the tone arm moves inwardly over the record.

The end 286a may also be actuated by the end portion 288 (FIG. 9) of a reject lever 289 which is pivotally supported at 290 adjacent the support member 244 and is actuated by means of the reject control rod 291 connected to a control arm 292 (FIG. 5) on the reject and on-off shaft 293. The reject lever 289 is also provided with an arm 294 which is adapted to engage the notched switch actuating arm 295 of the on-off switch 56.

Considering now the operation of the above-described mechanism for moving the tone arm 35 during the record changing cycle, during the playing cycle the end portion 287 of the lever 249 engages the end 286a after the tone arm 35 has moved inwardly beyond the 7 inch record starting position and moves the trip slide 105 outwardly. The slide 106 is also moved outwardly due to the friction between the slides 105 and 106 but each time the gear 81 is rotated one revolution the projection 104 thereon engages the post 103 and pivots the escapement 95 back to its initial position so that the hook portion 98 continues to hold the pawl 91 out of engagement with the gear 81. However, when the playing cycle is over and the stylus engages the run-out groove of the record, the slides 105 and 106 are moved outwardly by an amount sufficient to remove the hook portion 98 from the pawl 91 and permit this pawl to engage the driving gear 81 so that the idler wheel 80 is rotated. As the idler wheel 80 rotates, the cycling slide 87 is moved away from the axis of the turntable by means of the above-described crank mechanism 85, 86.

When the cycling slide 87 is moved away from the axis of the turntable, the inclined portion 260 thereof engages the bottom of the elevating rod 254 and moves this rod upwardly so that the tone arm 35 is lifted off of the record. At the same time, the coil spring 259 is compressed so that the tone arm lever 249 is urged upwardly against the bottom surface of the tone arm return lever 261. As the cycling slide 87 continues to move away from the spindle 33, the flange 280 thereon engages the notch 281 in the tone arm lever 249 and rotates this lever in the counterclockwise direction, as viewed from above the record changer, so that the tone arm 35 is swung away from the centering spindle and into the housing 34. At the same time the end portion 287 on the tone arm lever 249 engages the offset portion 286 on the trip slide 105 and moves both the slides 105 and 106 inwardly so that the hook portion 98 will engage the pawl 91 when the idler wheel has completed one revolution and disengage the wheel 80 from the driving gear 81. As the tone arm lever 249 is rotated a sufficient amount to bring the dimple portions 263 thereof into alignment with the openings 262 in the tone arm return lever 261, the levers 249 and 261 are connected together and are rotated together by engagement of the flange 280 with the notches 281 and 282 on these levers. Accordingly, the upstanding portion 265 on the tone arm return lever 261 is moved away from the notch portion 274 on the selector lever 269 to permit the selector lever 269 to be reset. When the idler wheel 80 is rotated approximately a quarter of a revolution, the tab portion 273 thereon engages the upper surface of the finger 272 on the end of the lever 269 and depresses the same so that the latch portion 275 on the other end of the selector lever 269 is lifted sufficiently to permit the latch portion 278 of the 12-inch indexing arm 276 to move under the latch 275 and hold the selector lever 269 in the position shown in FIG. 10 of the drawings. As the cycling slide 87 is returned inwardly to the centering spindle 33, the tone arm return lever 261 and tone arm lever 249 are rotated in a clockwise direction, as viewed from above the record changer, under the influence of the coil spring 264 until the notch 267 on the upstanding portion 265 of the lever 261 engages the notch portion 274 of the selector lever 269, at which point the tone arm return lever 261 ceases to rotate and the tone arm 35 is positioned correctly to engage the run-in groove of a 10 inch record.

A landing adjustment cam 296 is positioned on the upper end of the pivot shaft 245 above the base of the bracket 246 and engages an eccentric landing adjustment stud 297 which is positioned on the bracket 246, a coil spring 298 being employed to bias the landing adjustment cam 296 into engagement with the edge of the adjustment stud 297. Accordingly, the angular position of the tone arm 35 relative to the tone arm lever 249 may be adjusted by adjusting the landing adjustment stud 297. In this connection, it will be understood that the landing adjustment stud 297 may be adjusted so that when the tone arm return lever 261 is positioned by engagement of the notches 267 and 274 in the manner described above, the stylus 257 on the tone arm 35 is positioned correctly to engage the run-in groove of a 10 inch record.

As the cycling slide 87 continues to move in toward the axis of the turntable, the coil spring 259 is released and the tone arm lever 249 disengaged from the tone arm return lever 261 and, at the same time, the elevating rod 254 is lowered so as to lower the tone arm 35 and permit the stylus 257 to engage the run-in groove of the 10 inch record.

*Automatic positioning of tone arm at the beginning of a 7-inch, 10-inch or 12-inch record*

While the positioning of the tone arm 35 at the beginning of a 10 inch record has been described above in connection with the mechanism for moving the tone arm, it will be understood that if the record changer is to be fully automatic, i.e., capable of playing a group of intermixed 7 inch, 10 inch and 12 inch records, it is necessary to provide means for automatically positioning the tone arm 35 in accordance with the size of each record as it is deposited onto the turntable 31.

In order to position the tone arm 35 correctly for 7 inch records, there is provided a 7-inch control lever 299 which is pivotally supported on a recessed pivot 300 formed integral with the sub-assembly 70, and a screw 301 is employed to retain a coil spring 302 which urges the 7-inch control lever 299 into engagement with the pivot 300 on the member 70. The lever 299 is provided with an offset portion 303 which terminates in a downturned finger 304 which rides on the upper surface of the idler wheel 80 and is adapted to move into an opening 305 in the idler wheel 80 under the influence of the spring 306 when the idler wheel 80 is rotated so as to bring the opening 305 under the finger 304. The 7-inch control lever 299 is also provided with a lateral projection 307 which is adapted to engage the under side of the selector lever 269 in the manner shown in FIG. 10 and is provided with an upturned end portion 308 which may project through an opening 309 in the base member 30, but which is not of sufficient height to extend above the surface of the turntable 31 in any position of the 7-inch control lever 299.

In order to control movement of the 7-inch control lever 299, there is provided a bell crank lever 310 (FIG. 9) which is pivotally supported at the pivot 311 on the base member 30. One arm 312 of the bell crank lever 310 extends laterally across the cycling slide mechanism between the sub-assembly member 70 and the base 30, and the end of the arm 312 is adapted to be engaged by an arm 313 which is supported on the extension arm 157. A flexible wire member 314 is supported on the bell crank lever 310 and extends generally parallel to the arm 312 on the other side of the end portion 308 of the 7-inch control lever 299. The other arm 315 of the bell crank lever 310 is adapted normally to engage a control rod 316 which extends through an opening 317 in the base member 30 and is pivotally connected at its upper end to the end of the 10-inch indexing lever 38 by means of the pivotal connection 318. The control rod 316 is provided with a portion of enlarged diameter which defines a shoulder 319 which is adapted to engage the edges of the opening 317 when the control rod 316 is permitted to fall of its own weight, thereby positioning the lever 38 substantially horizontally.

When the record changing cycle is initiated and the idler wheel 80 is rotated in the manner described above, the opening 305 therein is moved to a point immediately below the finger 304 of the 7-inch control lever 299. However, if either a 10 inch or a 12 inch record is released onto the turntable during the first portion of the record changing cycle, the released record strikes the 10-inch indexing arm 38 and moves this lever downwardly so that the control rod 316 is moved upwardly out of engagement with the edge of the arm 315. A spring 320, connected from the arm 315 to a stud 321 on the base member 30, pivots the bell crank lever 310 so that the wire member 314 exerts a sidewise force on the end portion 308 of the 7-inch control lever 299. Accordingly, when either a 10 inch or a 12 inch record is deposited on the turntable, the 7-inch control lever 299 is held in the position shown in FIG. 8 by means of the wire member 314, even though the finger 304 is positioned over the opening 305 in the idler wheel 80, in which position the projection 307 on the 7-inch control lever 299 does not engage the selector lever 269 and, hence, has no effect upon the positioning of the tone arm.

On the other hand, if a 7 inch record is released onto the turntable, the 10-inch indexing arm 38 is not struck by the record as it falls onto the turntable so that the control rod 316 is not moved upwardly and the wire member 314 does not engage the end portion 308 of the 7-inch control lever 299. Therefore, when the idler wheel 80 is rotated sufficiently to bring the opening 305 thereof beneath the finger 304, the projection 307 on the 7-inch control lever 299 is moved upwardly by means of the spring 306 so that the selector lever 269 is moved upwardly by an amount sufficient to position the notch portion 274 thereof opposite the notch 266 on the tone arm return lever 261. Under these conditions, the tone arm return lever 261 is rotated under the influence of the coil spring 264 until the notch portions 266 and 274 engage, in which position the tone arm 35 is correctly positioned to begin a 7 inch record.

In order to return the bell crank lever 310 to its original position and reset the 10-inch indexing arm 38, there is provided the control arm 313 which moves with the cycling slide 87 and engages the arm 312 of the bell crank lever 310 as the cycling slide 87 completes its movement toward the spindle 33. When the bell crank lever 310 is rotated sufficiently by means of the arm 313, the control rod 316 drops down behind the edge of the arm 315 thereof and holds the bell crank lever 310 in the position shown in FIG. 9 wherein the wire member 314 is not in engagement with the end portion 308 of the 7-inch control lever 299. In this connection, it will be understood that the portion 308 of the 7-inch control lever 299 is held down by means of the wire member 314 for both 10 inch and 12 inch records so that the selector lever 269 is only lifted up by the projection 307 when a 7 inch record is deposited on the turntable. It will also be understood that the position of the opening 305 on the idler wheel 80 is such that the finger 304 can move into the opening 305 and permit the selector lever 269 to be raised opposite the notch portion 266 at the same time that the tone arm return lever 261 is being rotated so that the latch portion 274 thereof may engage the shelf 322 on the upstanding portion 265 of the tone arm return lever 261 before the finger 304 strikes the edge of the opening 305 and pivots the 7-inch control lever 299 back to its normal position.

Considering now the manner in which the above-described positioning mechanism is employed to position the tone arm 35 correctly for 12 inch records, it will be understood that the 12-inch indexing lever 276 is not struck by 10 inch records but is struck by the edge portion of a 12 inch record as it is released onto the turntable 31. When a 12 inch record strikes the inclined indexing head 323 of the 12-inch indexing lever 276, this lever is pivoted about the pivot 277 so that the latch portion 278 thereof is moved inwardly toward the axis of the turntable and the latch 275 on the selector lever 269 is permitted to drop inside the latch portion 278. In this position, the notch portion 274 of the selector lever 269 is positioned in the same plane as the notch 268 on the tone arm return lever 261 so that as this lever is rotated under the influence of the spring 264, the notch portions 268 and 274 engage, in which position the tone arm 35 is positioned correctly to engage the run-in groove of a 12 inch record. In this connection, it will be understood that the 10-inch indexing lever 38 is also struck and moved downwardly by a 12 inch record so that the wire member 314 is urged into engagement with the end portion 308 of the 7-inch control lever 299. However, this does not interfere with the movement of the latch portion 278 when a 12 inch record strikes the 12-inch indexing lever 276 so that the selector lever 269 is correctly positioned for playing a 12 inch record when the 12-inch indexing lever 276 is actuated. It will also be understood that the selector lever 269 is reset during each record changing cycle by engagement of the tab portion 273 with the finger 272 on the selector lever 269 so that the latch portions 275 and 278 are restored to the position shown in FIG. 10 during each record changing cycle.

While there have been described what are at present considered to be the preferred embodiments of the invention, it will be understood that various modifications may be made therein which are within the true spirit and scope of the invention as defined in the appended claims.

I claim:

1. In an automatic record changer, a rotatable turntable, a centering spindle, means including said spindle for supporting a stack of records of small and large diameters on said spindle above said turntable, a tone arm adapted to be moved into engagement with a record after it is deposited on said turntable, automatic record changing means for successively releasing individual records from said stack to said turntable during successive record changing cycles, a first tone arm indexing member positioned between the record stack and said turntable and movable by engagement of the outer edge portion of either a small diameter or a large diameter record as the record is released to said turntable, a second tone arm indexing member positioned between the record stack and said turntable and movable only by engagement of the outer edge portion of a large diameter record as the record is released to said turntable, means responsive to movement of said first tone arm indexing member only in those instances when said second tone arm indexing member is not simultaneously moved by a large diameter record for positioning said tone arm to the small diameter record position, and means responsive to movement of said second tone arm indexing member for positioning said tone arm to the large diameter record position.

2. In an automatic record changer, as set forth in claim 1, the combination wherein said spindle is arranged to support records of small, medium and large diameters, said first tone arm indexing member is movable only by engagement with the outer edge portion of either a medium or large diameter record, said second tone arm indexing member is movable only by engagement with the outer edge portion of a large diameter record, means responsive to movement of said first tone arm indexing member which occurs without the simultaneous movement of said second tone arm indexing member for positioning said tone arm to a medium diameter record position, and means responsive to movement of said second tone arm indexing member for positioning said tone arm to a large diameter record position irrespective of any movement of said first tone arm indexing member.

3. In a record changer, a rotatable turntable for supporting records to be played, the records to be played including a first group of relatively small diameter records and a second group of larger diameter records, a tone arm positioned adjacent said turntable, automatic record changing means including centering spindle means for supporting a stack of records above said turntable and means for successively releasing individual records of the stack to the turntable during successive record changing cycles, a balance arm pivotally supported adjacent said turntable and movable from a first position beyond the edge of the record stack to a second position in engagement with the uppermost record of the stack, a control member, means responsive to movement of said balance arm from said first position to said second position for moving said control member from a retracted position to an operating position beneath the record stack, said control member when in said operating position being moved to an indexing position by engagement with the outer edge portion of a larger diameter record as said record is released to the turntable during a record changing cycle, and said automatic record changing means including means responsive to movement of said control member to said indexing position for positioning said tone arm on the uppermost record on said turntable in accordance with the diameter thereof.

4. In a record changer, a rotatable turntable for supporting records to be played, the records to be played including a first group of relatively small diameter records and a second group of larger diameter records, a tone arm positioned adjacent said turntable, automatic record changing means including centering spindle means for supporting a stack of records above said turntable and means for successively releasing individual records of the stack to the turntable during successive record changing cycles, a balance arm pivotally supported adjacent said turntable and movable from a first position in engagement with the uppermost record of the stack to a second position beyond the edge of the record stack, a control member, means responsive to movement of said balance arm from said first position to said second position for moving said control member from an operating position beneath the record stack to a retracted position beyond the edge of the record stack, said control member when in said operating position being moved to an indexing position by engagement with the outer edge portion of a larger diameter record as said record is released to the turntable during a record changing cycle, and said automatic record changing means including means responsive to movement of said control member to said indexing position for positioning said tone arm on the uppermost record on said turntable in accordance with the diameter thereof.

5. In a record changer, the combination as set forth in claim 4, including means responsive to movement of said balance arm from said second position to said first position for moving said control member from said retracted position to said operating position.

6. In a record changer, the combination as set forth in claim 4, wherein said tone arm has a rest position adjacent said turntable and said first position of said balance arm is above said rest position of said tone arm.

References Cited by the Examiner

UNITED STATES PATENTS 2,794,647   6/1957   Guest _____ 274—10

NORTON ANSHER, *Primary Examiner.*

J. F. PETERS, JR., *Assistant Examiner.*

UNITED STATES PATENT OFFICE
CERTIFICATE OF CORRECTION

Patent No. 3,297,328　　　　　　　　　　　　　January 10, 1967

James T. Dennis

It is hereby certified that error appears in the above numbered patent requiring correction and that the said Letters Patent should read as corrected below.

Column 28, line 62, for the claim reference numeral "4" read -- 3 --.

Signed and sealed this 24th day of October 1967.

(SEAL)
Attest:

Edward M. Fletcher, Jr.
Attesting Officer

EDWARD J. BRENNER
Commissioner of Patents